(12) United States Patent
Gagnon

(10) Patent No.: US 10,542,587 B2
(45) Date of Patent: Jan. 21, 2020

(54) HEATING ELEMENTS OF LARGE SIZES AND OF METALLIC TUBULAR DESIGNS

(71) Applicant: Gilles Gagnon, Terrebonne (CA)

(72) Inventor: Gilles Gagnon, Terrebonne (CA)

(73) Assignee: TEMP4 INC., Terrebonne (CA)

( * ) Notice: Subject to any disclaimer, the term of this patent is extended or adjusted under 35 U.S.C. 154(b) by 486 days.

(21) Appl. No.: 14/961,949

(22) Filed: Dec. 8, 2015

(65) Prior Publication Data
US 2018/0176991 A1    Jun. 21, 2018

(51) Int. Cl.
| | |
|---|---|
| *H05B 3/40* | (2006.01) |
| *H05B 3/42* | (2006.01) |
| *H05B 3/86* | (2006.01) |
| *H05B 3/00* | (2006.01) |
| *F24H 3/00* | (2006.01) |

(52) U.S. Cl.
CPC .............. *H05B 3/008* (2013.01); *F24H 3/002* (2013.01); *H05B 3/42* (2013.01)

(58) Field of Classification Search
CPC .......... F24H 3/003; H05B 3/0033–008; H05B 3/40–42; H05B 3/50; H05B 3/86
See application file for complete search history.

(56) References Cited

U.S. PATENT DOCUMENTS

| | | | | | |
|---|---|---|---|---|---|
| 3,492,463 | A | * | 1/1970 | Brieko ...................... | H05B 3/00 174/102 R |
| 4,045,763 | A | * | 8/1977 | Miyamoto ............... | A45D 1/28 219/202 |
| 4,412,126 | A | * | 10/1983 | Brockway ................ | H05B 3/44 165/183 |
| 6,057,532 | A | * | 5/2000 | Dexter ................. | H05B 3/0076 219/553 |
| 2004/0096204 | A1 | * | 5/2004 | Gerhardinger .......... | F24H 1/102 392/483 |
| 2007/0272398 | A1 | * | 11/2007 | Chan ......................... | F24C 7/04 165/185 |
| 2008/0006620 | A1 | * | 1/2008 | Lee ....................... | H05B 3/0033 219/534 |
| 2009/0179022 | A1 | * | 7/2009 | Ellis ........................ | H05B 3/50 219/228 |

(Continued)

*Primary Examiner* — Michael A LaFlame, Jr.
(74) *Attorney, Agent, or Firm* — Brouillette Legal Inc.; Robert Brouillette

(57) ABSTRACT

A series of metallic heating elements of large sizes are presented. A conventional metallic tubular heating element is positioned into a hollow metallic profile, wherein additional high temperature resistant components are used in different assemblies, as required. A coiled resistance conductor is positioned within the interstice of two metallic tubes fitted into one another, wherein an electrically insulating powder or grit is used within the interstice, and to embed the coiled resistance conductor, and wherein additional high temperature resistant components are used in different assemblies, as required. The assemblies provide methods to reduce the use of electrically insulating powders and/or thermally conductive powders for large size heating elements, and more particularly for radiant purposes; and components are also presented to improve the emissivity of the outer surface of the radiant heating elements with a colorful look, for surface temperatures operating around and up to 500° C. to 600° C.

35 Claims, 16 Drawing Sheets

Section A - A View

(56) References Cited

U.S. PATENT DOCUMENTS

| | | | | |
|---|---|---|---|---|
| 2010/0084394 A1* | 4/2010 | Konishi | ................ | H05B 3/009 |
| | | | | 219/534 |
| 2013/0269601 A1* | 10/2013 | Majima | ................ | H05B 3/145 |
| | | | | 117/217 |
| 2015/0201464 A1* | 7/2015 | Chan | ................... | H05B 3/0095 |
| | | | | 219/548 |
| 2016/0003397 A1* | 1/2016 | Miyazaki | ............... | B29C 65/02 |
| | | | | 428/212 |
| 2017/0069514 A1* | 3/2017 | Nosrati | ............ | H01L 21/67109 |
| 2017/0223776 A1* | 8/2017 | Xie | ...................... | F24H 9/1863 |

* cited by examiner

Oblique Side View

Oblique Bottom View

Oblique Side View

Oblique Side View

Oblique Side View FIGS. 6, 7A, 7B

Infrared rays emitted and reflected to the room or space

Section A - A View

Section A - A View

Section A - A View Rotated 45°

Oblique Side View

Oblique Side View

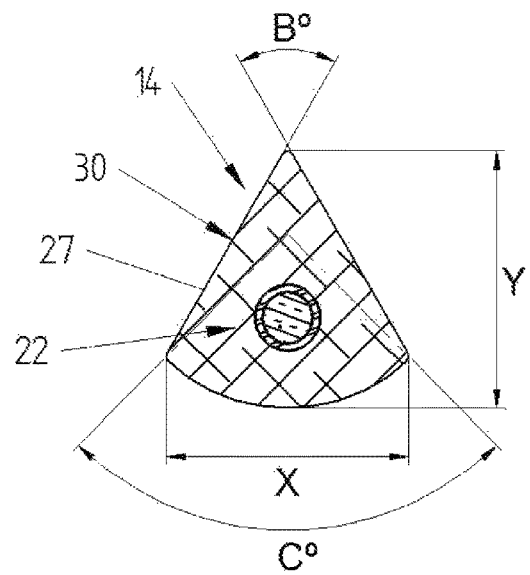
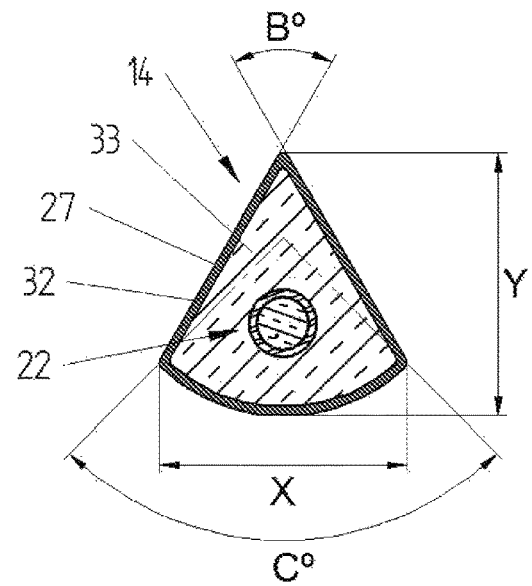
FIG. 9A Section B - B 45° Rotated View
FIG. 9B Section C - C 45° Rotated View
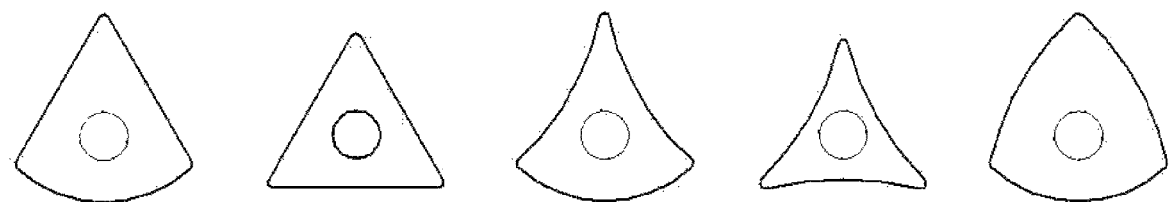
a b c d e
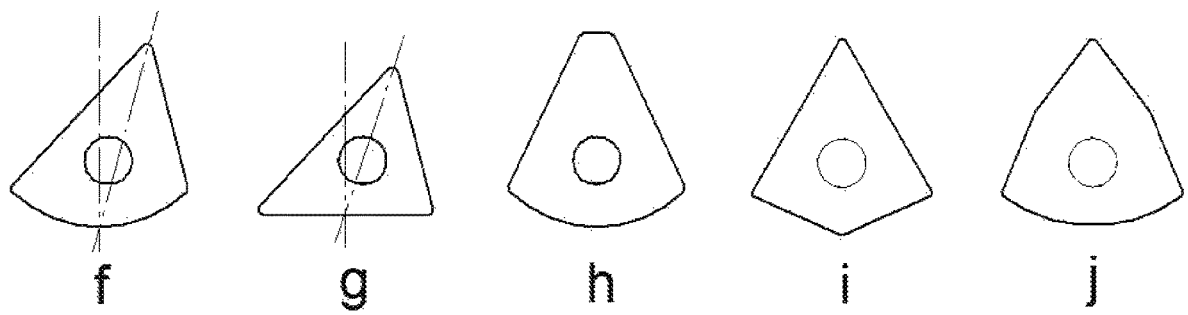
f g h i j
FIG. 10

Oblique Bottom View

Oblique Bottom View

Section D - D View

Front View with Partial Cutaway

Section E - E View

Front View with Partial Cutaway

Section F - F View

Front View with Partial Cutaway

Section G - G View

Front View with Partial Cutaways

Front View with Partial Cutaway

Front View with Partial Cutaway

Front View with Partial Cutaway

Section H - H Alternative Views

Front View with Partial Cutaway

Section J - J Alternative Views

Front View with Partial Cut-Out

HEATING ELEMENTS OF LARGE SIZES AND OF METALLIC TUBULAR DESIGNS

CROSS-REFERENCE TO RELATED APPLICATIONS

None

FIELD OF THE INVENTION

The present invention relates to electric heating elements and their use in general, but more specifically to heating elements, and their use in electric radiant heaters for indoor space heating and for outdoor spot heating. It relates to electric radiant heaters used for these applications, and more specifically to heaters using medium and far infrared rays to perform the task of heating office and residential spaces; high ceiling spaces such as warehouses, industrial buildings, commercial buildings, atriums; and also for spot heating of patios and entrances.

BACKGROUND OF THE INVENTION

It is known from many studies that space heating inside buildings using infrared rays, or otherwise known as radiant heat, provides energy savings over conventional natural or forced convection heating methods. The more a radiant heater can provide radiant heat versus convective heat, the more the savings are. In this day and age, where there are great requirements for reducing energy consumption, radiant heating is of the essence as space heating is one of the major contributors of energy use. There are basically three reasons for the energy savings with radiant space heating: One of them being that since infrared rays do not heat the air, but rather objects, the vertical air temperature profile in the room is much more uniform, thus causing less heat loss to the outdoor near ceiling level. Secondly, having a more uniform vertical temperature profile in the room causes the attendees to feel more comfortable, a lesser feeling of cold feet, hence resulting in thermostat set point to be set lower than would otherwise be the case. Thirdly, being heated with infrared rays similar to the sun to a certain extent, people feel warmer than they normally would at a specific air temperature, which again results in thermostat set point to be set lower than would otherwise be the case.

There are several methods being used today to provide infrared heating from an apparatus, but few of them make their way into the home, office, or commercial spaces; and those that currently do, have low radiant heat efficiencies. Few of them, also, make their way into warehouses, industrial and commercial buildings in high ceiling (above approx. 3.7 meters (12 feet)) areas; and for outdoor spot heating. For the latter applications, high intensity radiant heaters are required and they must have high radiant heat efficiencies for the user to benefit from all of the input power. Radiant heat efficiency used here is defined as:

Radiant heat efficiency (%)=(Radiant heat output)/(Power input)×100

The total radiating power emitted from a hot surface is defined by the Stefan-Boltzmann law:

$$P = \sigma \varepsilon A T^4, \text{ where:}$$

P is the radiant power in watts,
$\sigma$ is the Stefan-Boltzmann constant=$5.6704 \times 10^{-8}$ W/m²/°K⁴,
$\varepsilon$ is the emissivity of the radiating surface,
A is the area of the radiating surface in square meters, and
T is the temperature in degrees Kelvin of the radiating surface.

This equation shows that the radiating power from a hot surface is proportional to the fourth power of its temperature in degrees Kelvin, and to the single power of its emissivity and of its area. Thus, it is greatly advantageous to have as high a temperature as possible on the radiating surface of the heating element, in order to have a smaller heating device, which will have less area for generating convective heat. Any inefficiencies in radiant heat from an apparatus, converts mostly into convective heat. Hence as explained previously, the higher the radiant heat efficiency a heating apparatus can provide, the higher the energy savings shall be for the user in heating his home, office, commercial space, industrial space, or outdoor patio.

The most efficient methods of providing radiant heat today, are those apparatuses that make use of a cylindrical or tubular heating element, along with a reflecting surface at the back and around the main axis of the element, which reflects infrared rays in the desired direction. These include heating elements with quartz glass tubes. This type of design permits the use of higher temperatures of the heating elements. In order to have a high radiant efficiency, the heating element needs to either: have a high coefficient of emissivity like a ceramic heated tube, or be an infrared emitting quartz lamp. Unfortunately, infrared emitting quartz lamps and ceramic heated tubes are fragile and their life expectancies are approximately 5 000 hours and 10 000 hours, respectively. These kinds of heating devices generate light or glow red when in operation, and the heat provided is much too concentrated and is annoying for the user standing a few feet away. Gas-fired heated tube radiant heaters are similar in basic design, except they are much larger, they do not glow red, operate at lower temperatures, and yield much less radiant heat efficiency. Gas-fired heated tube radiant heaters have low radiant heat efficiencies, because of the larger surface area of the heated tube, giving off excess convective heat, and mostly because a high percentage of heat is lost with the exhaust flue gases. In addition, all of these kinds of devices are generally difficult to adapt to meet the safety standards of certifying agencies, for use indoors in low ceiling (below approx. 3.7 meters (12 feet)) spaces such as in homes, office and commercial spaces. This is because of the intense radiant heat and convective heat generated for installations close to a wall and/or a ceiling. They are mostly used in high ceiling spaces such as warehouses, industrial or commercial buildings, and outside patios for spot heating. All of these types of heaters require a reflecting surface with a high total reflectance, or low coefficient of emissivity, to reflect a high percentage of the incoming rays in the direction the heat is required. Depending on their specific design, the radiant heat efficiencies of these types of heaters today are known to be the following in Table 1 below:

TABLE 1

Tubular Heating Elements Used in Radiant Heaters with Reflectors and their Radiant Heat Efficiencies

| Heating Apparatus Type | Radiant Heat Efficiency Range (%) |
| --- | --- |
| Quartz lamp | 80%-90% |
| Quartz tube | 55%-65% |
| Ceramic tube | 83%-93% |
| Metallic tube | 50%-75% |
| Gas-fired heated tube | 40%-55% |

Another group of radiant heating apparatus being used today, makes use of a heating element of some kind to heat a flat or curved panel, which in turn provides the radiant heat to the user and space. These radiant panels are typically located on the ceiling, flush within a T-bar suspended ceiling, suspended from the ceiling, on a wall, attached to a wall, suspended from a wall, flush with the floor, inside the floor, or below the subfloor. The front faces of the panels are made of metal, or glass, or stone, or gypsum board, or mortar, or concrete, or plastic, or solid ceramic material, or ceramic fiber material, or mesh metal in the case of gas-fired heaters. The panels are heated with heating elements or gas burner nozzles that are inserted inside or at the back of the panel. Some of these panels have heat insulation material at the back to prevent a large amount of heat to go in the wrong direction. Some other panels do not have heat insulation at the back, in order to use this back heat as convective heat which in turn rises to the ceiling, as do the convective types of heating apparatus. Unfortunately, radiant panels, because of their basic flat design, cannot exceed much more above 50% in radiant heat efficiency. The infrared rays radiating at the back of the hot panel cannot be redirected to the front, and are thus converted into convective heat. Adding thermal insulation at the back of the panels increases the temperature at the front, whereby adding to the radiant heat generated to the occupants. Some of these types of radiant heating devices are being used for heating home, office and commercial spaces having low ceilings (below approx. 3.7 meters (12 feet)); and other types are being used for heating warehouses, industrial buildings, commercials buildings having high ceilings (above approx. 3.7 meters (12 feet)), and a few others used for patio spot heating. Because of their location in a building, heating panels used for space heating have limits on the temperatures they can attain to meet the safety standards and prevent fire hazards.

One can easily calculate and estimate the radiant heat efficiency of heating elements using the Stefan-Boltzmann equation, rearranged for the transfer of energy between the heating apparatus and the surroundings; and also estimate the radiant heat efficiency of the radiant heater by using the percentage total reflectance of the reflector, and the angle of direct emission of the heating element towards the surroundings. These can be calculated for panel type radiant heaters and for heaters using opaque tubular heating elements. Here are the equations:

Equations for Calculating Radiant Heat Output, Radiant Heat Efficiency of a Heating Element and of a Radiant Heater $$\text{Radiant heat output} = P = \sigma(1/(1/\varepsilon_e + 1/\varepsilon_s - 1))A(T_e^4 - T_s^4)$$

where:

P is the radiant heat in watts,
$\sigma$ is the Stefan-Boltzmann constant=$5.6704 \times 10^{-8}$ W/m²/° K⁴,
$\varepsilon_e$ is the emissivity of the radiating surface,
$\varepsilon_s$ is the average emissivity of the surrounding surfaces to be heated,
A is the area of the radiating surface in square meters,
$T_e$ is the average temperature in degrees Kelvin of the radiating surface, and
$T_s$ is the average temperature in degrees Kelvin of the surrounding surfaces.

$$\text{Radiant heat efficiency of element (\%)} = ((\text{Radiant output power})/(\text{Input power}))100$$

$$\text{Radiant heat effic. of heater (\%)} = (\text{Radiant heat effic. of element (\%)})((\text{Direct emission angle})/360) + (\text{Radiant heat effic. of element (\%)})((360 - (\text{Direct emission angle}))/360)(\text{Total reflectance})$$

Using the equations above, the radiant heat efficiencies of panel type radiant heaters are listed below in Table 2, with their commercial names and radiant heat efficiency ranges depending on their specific designs:

TABLE 2

Panel Type Radiant Heaters and their Radiant Heat Efficiencies

| Heating Apparatus Type | Radiant Heat Efficiency Range (%) |
| --- | --- |
| Ceiling panels (low ceilings) | 40%-50% |
| High temperature ceiling panels (high ceilings) | 45%-55% |
| Conventional cove heaters | 20%-30% |
| European style wall radiators (perforated front panel) | 30%-45% |
| Wall radiators (non-perforated front panel) | 10%-15% |
| European style decorative wall panels | 15%-25% |
| Floor warming panels (covering most of the floor) | 40%-58% |
| Gas-fired patio heaters | 45%-60% |

There are five types of heating elements or radiant heating elements used in radiant heaters, to which the present invention can be compared in view of their dimensions; and use in various applications. The present invention provides many improvements over the prior art for an increase use of radiant heaters in various applications. It is first important to recognize the characteristics of the prior art according to the current heating elements, or radiant heating elements, and their use in radiant heaters; and those are according to the following:

1. Heater Using Quartz Lamp and Reflector:
   a) Heating element consisting of a tungsten filament operated at 1800° C. to 2500° C. (3300° F. to 4500° F.) inside a short and narrow molded quartz glass tube
   b) Circular quartz tube diameters up to 21 mm (0.83 inch)
   c) Fragile heating element
   d) Lamp life expectancy of approx. 5 000 hours
   e) Emits high intensity white light
   f) Radiant heat concentrated in a narrow width
   g) Radiant heat efficiency in the range of 80% to 90%
   h) Installation with large clearances from supporting wall or ceiling
   i) Mostly used for outdoor spot heating and for space heating of industrial buildings and warehouses with high ceilings 2. Heater Using Quartz Tube and Reflector:
   a) Heating element consisting of a nickel-chrome coiled resistive conductor operated at 700° C. to 900° C. (1300° F. to 1650° F.) inside a quartz glass tube
   b) Circular quartz tube diameters up to 25 mm (1 inch)
   c) Fragile heating element
   d) Tube life expectancy of approximately 5 000 to 10 000 hours depending on element coil temperature
   e) Emits a glowing red light
   f) Low radiant heat efficiency in the range of 55% to 65%
   g) Installation with large clearances from the supporting wall or ceiling
   h) Mostly used for outdoor spot heating and for space heating of industrial buildings and warehouses with high ceilings 3. Heater Using Ceramic Tubular Heating Element and Reflector:

a) Heating element consisting of a nickel-chrome coiled resistive conductor operated at 600° C. to 750° C. (1100° F. to 1380° F.) inside a tube made of a ceramic type material
b) Circular tube diameters normally ranging from 10 mm (0.4 inch) to 20 mm (0.8 inch)
c) Fragile heating element, especially at the larger diameters
d) Element life expectancy of approximately 10 000 to 15 000 hours depending on element coil temperature used
e) Emits a glowing red light, if element surface temperature exceeds 500° C. (930° F.)
f) Radiant heat efficiency in the range of 83% to 93%
g) Ceramic color can be white, gray or black depending on the choice of ceramic material used
h) For space heating inside homes and offices without the glowing red light, the heating element would need to have a large diameter and/or a long length, which would render it to be too fragile 4. Heaters Using Metallic Tubular or Cartridge Heating Element and Reflector:
a) Heating element consisting of a nickel-chrome coiled resistive conductor operated at 600° C. to 800° C. (1100° F. to 1470° F.) inside a metallic tube, and electrically insulated from the metallic tube using a powder of ceramic type material. The ceramic powder needs to have a high electrical resistivity, and a high thermal conductivity to properly conduct the heat to the metallic tube
b) Circular tube diameters or sizes ranging from 5 mm (0.2 inch) to 16 mm (0.625 inch) (commercial availability)
c) Robust heating element
d) Element life expectancy of approximately 35 000 to 250 000 hours depending on the element coil temperature used
e) Emits a glowing red light, if element surface temperature exceeds approximately 500° C. (930° F.)
f) Metallic tube color is silver metallic or charcoal grey, if with a black oxide surface treatment
g) Radiant heat efficiency in the range of 50% to 75%, depending on metallic tube surface treatment or coating
h) Installation with large clearances from the supporting wall or ceiling
i) Mostly used for space heating of industrial buildings and warehouses with high ceilings
j) For space heating inside homes and offices without the glowing red light, because of the non-availability of large diameters for the heating element, it would need to be very long to the point of not fitting into the room; or to be bent, which would not be acceptable as a nice decor 5. Conventional Cove Heater Using an Assembled Heating Element:
a) They consist of a long, narrow and thin extruded aluminum panel, which is heated by a metallic tubular heating element inserted into a groove in its near center main axis. The front panel has a width of 100 mm (4 inches) to 115 mm (4½ inches). Their typical linear watt density is in the range of 500 to 560 watts per meter (150 to 170 watts per foot)
b) Installed in a horizontal orientation close to the corner of a wall and ceiling for space heating for housing and offices, with the panel oriented toward the middle of the room
c) A clearance to a gypsum board ceiling of 64 mm (2.5 inches) to 114 mm (4.5 inches) is needed, and a clearance to a wall in the range of 18 mm (0.7 inch) to 20 mm (0.8 inch) is also required, depending on the manufacturer and the design, because of the large amount of convective heat generated
d) The temperature in the center and middle of the front panel is in the range of 165° C. (330° F.) to 210° C. (410° F.), depending on the manufacturer.
e) Robust assembled heating element
f) Element life expectancy of more than 250 000 hours
g) Low radiant heat efficiency in the range of 20% to 30%.
h) Many colors can be offered for the front panel, including white, as colored coatings withstanding these temperatures.

One can recognize that the ideal heating element for long term radiant heating would need to be a metallic tubular type with a large cross-sectional size across its narrow outline, larger than the current availability, with a high emissivity coating or treatment on its surface, and operated at surface temperatures below the point where light is emitted. The large cross section for the heating elements is required, in order to have reasonable lengths to meet with the requirements of the dimensions of the heated space, and to have dimensions of radiant heaters comparable to the prior art. Such metallic tubular heating elements, whether circular or heart shaped in cross section, are currently not available. Metallic tubular heating elements of circular cross section, and of triangular or heart cross section, are currently not available in the market place at sizes larger than 16 mm (0.625 inch).

Providing new and efficient radiant heating elements that can be easily manufactured at competitive costs, and used for radiant heating apparatus for many applications such as in homes, offices, small commercial spaces, warehouses, industrial buildings, commercial buildings, atriums, and for outdoor spot heating without the disadvantages of the prior art, is not an easy task. As space heating is one of the major users of energy throughout the world, and where in this new age, there is an enormous need for the reduction of energy consumption, and considering that radiant space heating has been proven in many studies to save energy over conventional methods of heating, it is therefore becoming increasingly important to develop efficient radiant heating devices. The present invention has met those requirements, and is described in the following sections.

SUMMARY OF THE INVENTION

For low ceiling indoor spaces (below approx. 3.7 meters (12 feet)), the shortcomings of the prior art are generally mitigated by too intensive and glowing radiant heat emanating from a very high temperature cylindrical, or tubular heating element inside a relatively small apparatus, where many safety requirements are difficult to meet. For radiant heating elements running at lower temperatures, the shortcomings of the prior art are generally mitigated by low radiant heat efficiencies obtained from panel type apparatuses, or long and large ceramic tubular heating elements that are too fragile, or to heaters using conventional metallic tubular heating elements that would not fit a room.

For high ceiling indoor spaces (above approx. 3.7 meters (12 feet)) and outdoor spot heating, the shortcomings of the prior art are generally mitigated by either having fragile, short lived and light emitting heating elements, or by simply having fragile heating elements, or by having heating elements or technologies that provide low radiant heat efficiencies to benefit from energy savings.

The invention described herewith provides the means to manufacture heating elements of larger diameters or larger cross sections, in order to have lower element surface temperatures from radiant heaters of comparable dimensions and power input to the prior art. In addition, it provides heating elements that are durable, have long life expectancies, and delivering radiant heat efficiencies of at least 60% and up to 90%, depending on design and requirements. These elements can be manufactured with minimal investment and at competitive costs.

Here are other basic characteristics that this invention provides to radiant heaters:

i. Being able to have surface temperature on the heating elements down to below the point where light is emitted (approx. 500° C. (930° F.)) and even lower, down to approximately 200° C. (390° F.), and still have comparable size radiant heaters for the applications.

ii. To use the technology of tubular heating elements along with reflectors, and iii. Obtain radiant heat efficiency of up to 72% for indoor low ceiling spaces, and iv. Obtain radiant heat efficiency of up to 85% for indoor high ceiling spaces and for outdoor spot heating, and v. Have heater dimensions comparable in size to the conventional cove heater for indoor low ceiling spaces; and also comparable in size to heaters using quartz tubes, or ceramic tubes or metallic tubular heating elements for high ceiling spaces and for spot heating, and vi. Ability to emit the infrared rays in a manner that would be comfortable at close range for indoor low ceiling spaces, and vii. Ability to be installed at much closer proximity to a wall and/or a ceiling than a cove heater of the prior art, and meet the safety standards for low level and high ceiling spaces, and viii. Ability to be acceptable in design and able to have standard colors such as white, almond, or others, in addition to black and grey, for the surface of the heating element in order to fit with the room or space decor of homes and offices.

There are two basic embodiments of invention which comprise three avenues of innovation for heating elements of large sizes for mainly radiant heaters and for other uses. Hence, in this document there are three inventions which provide three new and innovative types of heating elements for electric radiant heaters, and for electric heating in general.

The first of these avenues of invention provides radiant heating elements having cross-sectional shapes across its narrow outline in the form of a triangle, or of a curvilinear triangle, of sizes that are much larger than the conventional metallic tubular heating elements with triangular or heart shape available on the market. These conventional metallic tubular heating elements with triangular or heart shape are limited in nominal sizes at up to 16 mm (0.625 inch). The major dimension of the radiant heating elements, according to this first avenue of invention, would range from 19 mm (0.75 inch) to typically 51 mm (2 inches) or larger for low ceiling spaces, and to typically 127 mm (5 inches) or larger for high ceiling spaces. This triangular cross-sectional shape permits the use of much narrower reflectors, thus providing the possibility of manufacturing narrow radiant heaters having high radiant heat efficiencies compared to the prior art. The first avenue of innovation consists of a conventional metallic tubular heating element, of standard availability, that is inserted into a larger formed metallic tube, or extruded metallic profile, or molded metallic profile with the outer perimeter of its cross section in the shape of a triangle, or of a curvilinear triangle, or of any version of a triangular shape. The clearance, if large enough, between the conventional metallic tubular heating element and the inner wall of the outer metallic tube or profile, is filled with either a high temperature adhesive-sealant, or a heat conductive material depending on the width of the clearance. These filling materials need to have a relatively high coefficient of thermal conductivity and be resistant to the high temperatures encountered. A high electrical resistivity is not required for the filling material, as it is not in contact with the coiled resistive conductor. The size of the cross section of the radiant heating element can now be much increased, in order to reduce the overall length of the heater, or to reduce the power density without obtaining excessive heater lengths. The outer surface of the outer metallic tube or profile is treated or coated with a high emissivity coating that is resistant to the operating temperatures. Having heating elements with lower surface temperatures, permits the use of high emissivity coatings that are resistant to these temperatures. Such designs, cross sections and sizes for radiant heating elements in radiant heaters are innovations compared to the prior art.

The second avenue of invention provides radiant heating elements of large circular diameters, which are not currently manufactured and available within the industry. It will provide the possibility of using circular heating elements having diameters from 19 mm (0.75 inch) and typically up to 51 mm (2 inches), and higher if needed. The second avenue of invention consists of a conventional metallic tubular heating element, of standard availability, that is inserted into a metal tube, or metal pipe, or more generally into a hollow metallic cylinder. It can also be inserted into two or more metallic hollow cylinders fitting into one another to limit the quantity of filling materials to use. Like the previous avenue of innovation, the clearances, if large enough, between the metallic tubular heating element and the inner wall of the hollow metallic cylinder, and between the hollow cylinders, are filled with either a high temperature adhesive-sealant, or a heat conductive material depending on the width of the clearances. These filling materials need to withstand the operating temperatures and have a relatively high coefficient of thermal conductivity, without the requirement of a high electrical resistivity. The outer surface of the outer metallic cylinder is treated or coated with a high emissivity coating that is resistant to the operating temperatures. The outer diameter of the circular cross section, the distance to the reflector and the length can be adjusted with much more flexibility to fit with the application. One can now operate at a whole range of heating element surface temperatures, and even below 500° C. (930° F.), and limit the overall length of the radiant heater to acceptable or preferred levels.

The third avenue of invention provides a series of totally new designs for the manufacture of large size metallic tubular heating elements, without the use of excessive electrically insulating material for the coiled resistive conductor to transfer the heat to the outer metallic tube. It uses an interstice design, where the coiled resistive conductor is between an inner metallic tube and an outer metallic tube. The inner components used have similar characteristics as conventional metallic tubular heating elements. This series of alternative designs reduce extensively the use of the electrically insulating material that would be required for large size metallic tubular heating element of the prior art. In these types of design, the electrically insulating material requires a high electrical resistivity, as well as a relatively high thermal conductivity and a resistance to the operating temperatures. The electrically insulating material is generally chosen from ceramic type powdered materials that are expensive. Magnesium oxide powder is the material that is currently used the most for this task. The cross section of the outer metallic tube can be anywhere from being circular, or triangular, or of a curvilinear triangle form similar to the previous two avenues of invention. Similarly, the outer surface of the outer metallic tube is treated or coated with a high emissivity coating to improve the radiant characteristics of the heating element. The designs of this third avenue of invention can replace the ones from the previous two avenues of invention, depending on equipment investment cost and on the manufacturing costs.

Other and further aspects and advantages of the present avenues of invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of these avenues of invention will become more readily apparent from the following descriptions, reference being made to the accompanying drawings in which:

FIG. 9A (FIG. 9A) is a cross-sectional view sectioned perpendicularly across the longitudinal main axis of the radiant heating element from the alternative construction of FIG. 8A, and shows a closer view of its components.

FIG. 9B (FIG. 9B) illustrates a similar cross-sectional view, as FIG. 9A, but for the radiant heating element from the alternative construction of FIG. 8B, and shows a closer view of its components.

FIG. 10 (FIG. 10) shows cross-sectional views from a) to j) of the radiant heating element, from the first avenue of invention, sectioned perpendicularly across its longitudinal main axis to illustrate the alternative perimeter profiles that it can have, and mixtures of them all, and still provide an efficient radiant heater with an appropriate corresponding reflector.

FIG. 15A shows a front view of one end of radiant heating element 44, with a partial view of the inside components within the elliptic cutaway in the center, and where FIG. 15B exposes the cross-sectional view of section E-E of FIG. 15A. In this design, a hollow metallic cylinder is used to increase the outside diameter of a conventional metallic tubular heating element of current availability.

DETAILED DESCRIPTION OF THE PREFERRED EMBODIMENT

A novel series of heating elements for use in electric radiant heaters will be described hereinafter, and further identified as three different avenues of invention. Although the invention is described in terms of specific illustrative embodiments, it is to be understood that the embodiments described herein are by way of example only and that the scope of the invention is not intended to be limited thereby.

Figure 1:
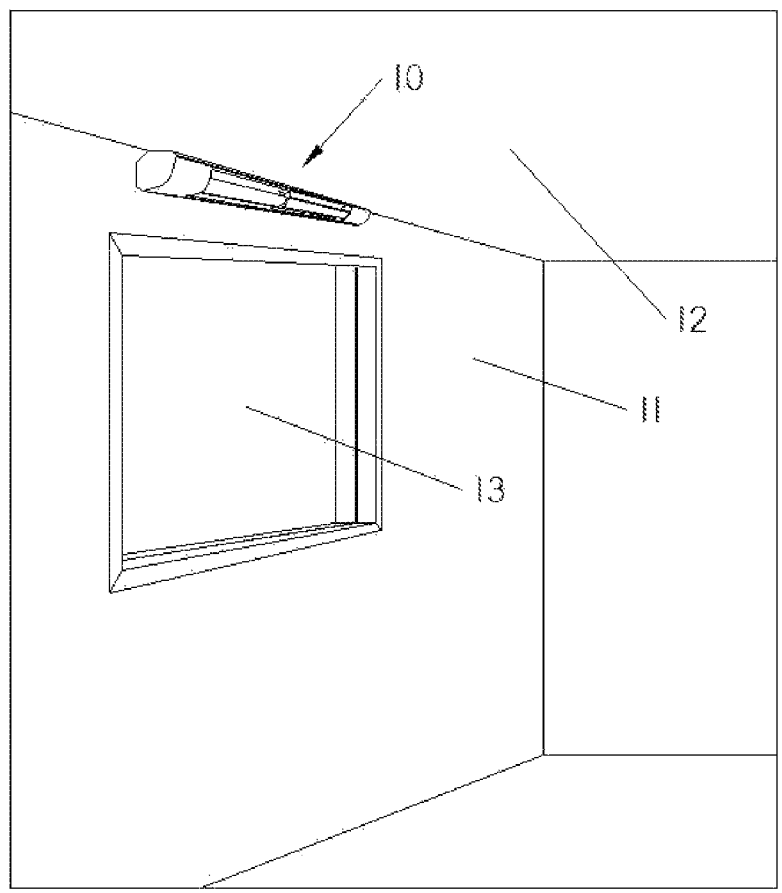
FIG. 1 (FIG. 1) is an illustration showing, in an oblique side view, an electric radiant heater for the applications of indoor heating of low ceiling spaces, typically positioned at the corner of a wall and ceiling above a window in a room, or office, or commercial space. This type of electric radiant heater uses one type of radiant heating element according to the first avenue of invention.

Referring to FIG. 1, a room, or office or commercial space is illustrated in an oblique side view showing the preferred installation location of radiant heater 10, installed at the corner of a wall 11 and the ceiling 12 above a window 13.

Figure 2:
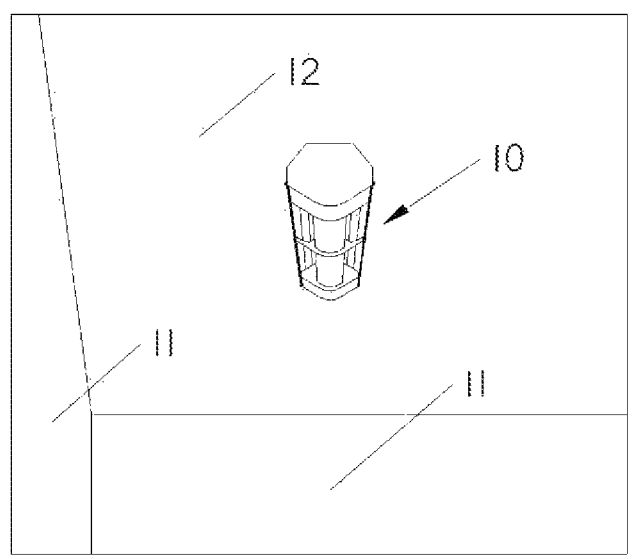
FIG. 2 (FIG. 2) shows, in an oblique view from below, an electric radiant heater for the applications of indoor heating of high ceiling spaces and outdoor spot heating, typically fixed on the ceiling in a commercial or industrial space. This type of electric radiant heater uses the same type of radiant heating element according to FIG. 1, except arranged for operating at higher temperatures.

Referring to FIG. 2, a commercial or industrial space with a high ceiling is illustrated, in an oblique under view, showing radiant heater 10 installed at close proximity to the ceiling 12 near walls 11.

Figure 3:
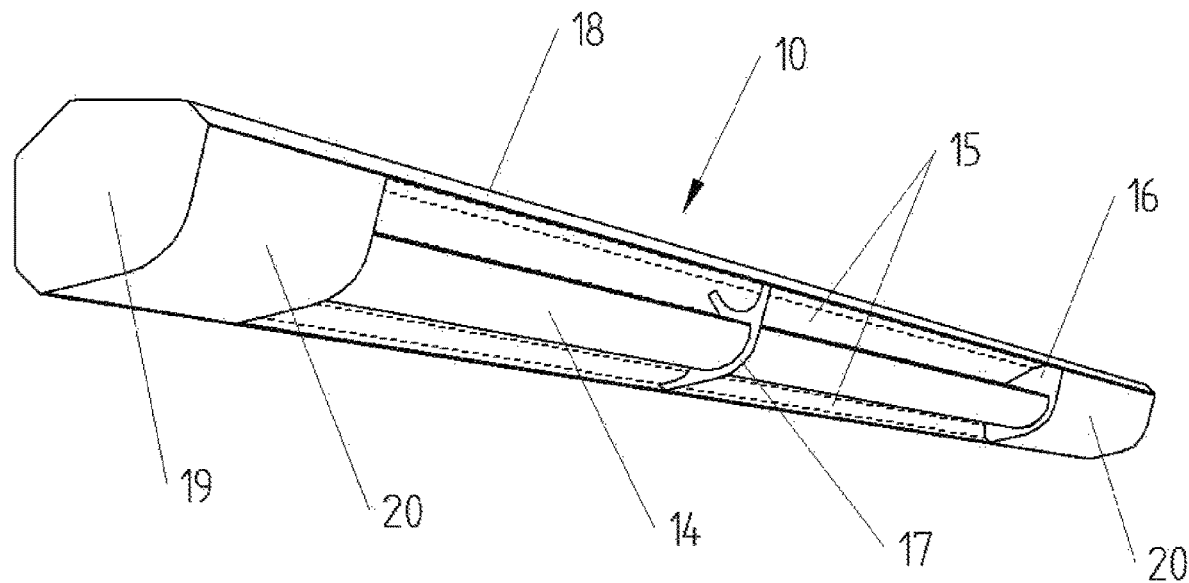
FIG. 3 is a drawing showing an oblique side view of the radiant heater illustrated in FIG. 1 and FIG. 2, in one of its design alternatives, with its major outer components.

FIG. 3 illustrates an oblique side view of radiant heater 10 showing its major components. radiant heating element 14, according to the first avenue of invention, is shown in the middle between the two wire junction box front covers 20, at each end of radiant heater 10. The reflector 15 lies behind and partially around the radiant heating element 14 along its main longitudinal axis. Heating element end supports 16, one at each end as shown, hold the radiant heating element 14 in place at each end within reflector 15. Heating element end supports 16 reflect the infrared heat emitted to them, and provide permanent heat and safety covers for the wire junction boxes at each end under front covers 20. An enclosure 18 covers the back and sides of radiant heater 10 along its main longitudinal axis. For most models of radiant heater 10, a heating element center support 17 is used and helps to hold the radiant heating element 14 in place in the middle within reflector 15, and at the same time holds and maintains the shape of reflector 15. For relatively long models of radiant heater 10, more than one heating element center support 17 can be used. End covers 19, at each end of radiant heater 10, also provide the protection and access to the electrical components and wiring, within the junction boxes under them and under front covers 20. Front covers 20 and/or end covers 19 can be removed to fix radiant heater 10 to a wall 11 and/or to a ceiling 12. Other designs are possible for heating element end supports 16 and center support 17, as long as they provide the required overall dimensions of the reflector, and maintain radiant heating element 14 firmly in its center position.

Figure 4:
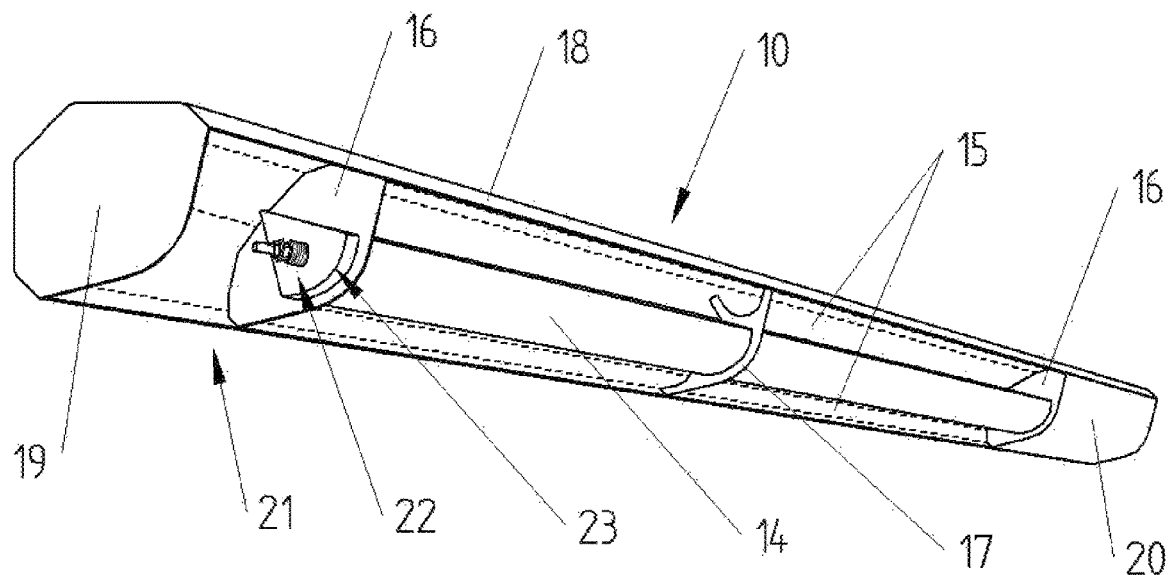
FIG. 4 (FIG. 4) displays the same as in FIG. 3, except a cover of one the ends of the radiant heater is removed to show more components of the radiant heating element. In this first avenue of invention, a standard metallic tubular heating element of current availability is inserted into the larger metallic profile of triangular shape.

FIG. 4 also illustrates an oblique side view of radiant heater 10, but with a front cover 20 removed to show the inside of one of the wiring junction boxes 21. One end of a conventional metallic tubular heating element 22 can be seen in the middle of the metallic triangular profile 23. It is the combination of a conventional metallic tubular heating element 22, inserted inside the metallic triangular profile 23 and forming a radiant heating element 14 which provide the innovation of the first avenue of invention.

Figure 5:
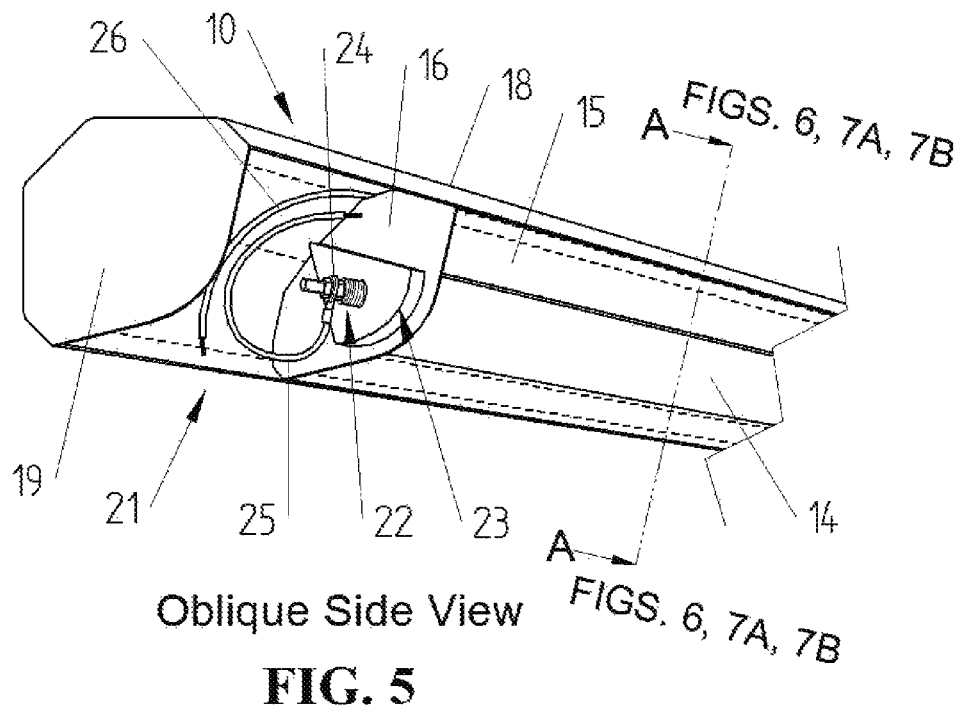
FIG. 5 (FIG. 5) illustrates a closer oblique side view of one of the wiring junction boxes from one end of the radiant heater of FIG. 4, and have a better view of the radiant heating element, and show more components.

FIG. 5 shows a closer oblique side view of one end of radiant heater 10 and the inside of one of the wiring junction boxes 21. The conventional metallic tubular heating element 22 (from now on named as: conventional tubular heating element 22) can be seen exiting, by one of its ends, from the center of the metallic triangular profile 23 of the radiant heating element 14. A typical wiring terminal 24 at the end of metallic tubular heating element 22 is used to make a wiring connection with the radiant heating element 14 using lead wire 25. The other lead wire 25 from the other wiring junction box 21 at the other end of radiant heater 10 is electrically connected to cross wire 26. Cross wire 26 runs between enclosure 18 and reflector 15 from one wiring junction box 21 to the other wiring junction box 21 at the other end of radiant heater 10. Both lead wire 25 and cross wire 26 are used to make the electrical connections with the power supply. In the cases where a one-ended conventional tubular heating element 22 would be used, rather than a two-ended conventional tubular heating element 22 as shown, the two lead wires 25 would be extending from one end of the conventional tubular heating element 22, and cross wire 26 would not be required to make the proper connections to the power supply.

Figure 6:
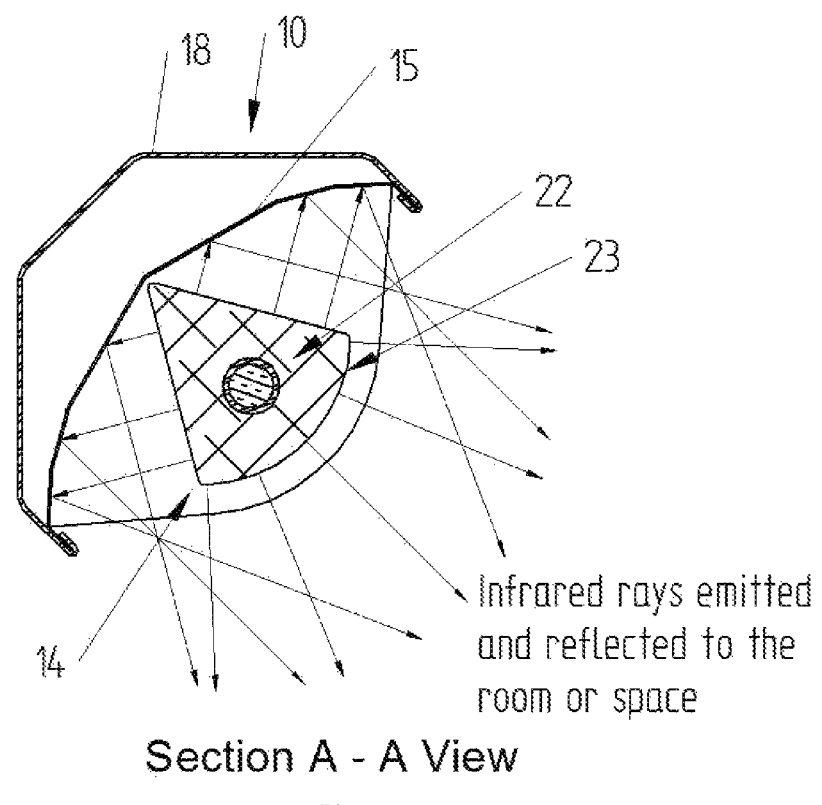
FIG. 6 (FIG. 6) is a cross-sectional view of the radiant heater of FIG. 5 sectioned perpendicularly across its longitudinal main axis, near the middle, showing how the infrared rays are emitted from the radiant heating element, and into the indoor or outdoor space. It illustrates the basic directions the infrared rays are emitted from the front of the radiant heating element, and how they are directed to the front of the unit from the sides of the heating element by the reflector.

FIG. 6 is a cross-sectional view of radiant heater 10 sectioned perpendicularly across its longitudinal main axis at section A-A in FIG. 5, showing how the infrared rays are emitted from the radiant heating element 14, then reflected according to the law of reflection by reflector 15 towards the space in front of radiant heater 10. Notice how the infrared rays are basically emitted sideways from the radiant heating element 14, and away from the reflector 15, within a relatively small space on each side of radiant heating element 14. This pattern of basic emission of the infrared rays is caused by the triangular cross section of the metallic triangular profile 23 of radiant heating element 14, along with a conventional tubular heating element 22 inserted in its center. Because of the angle of general emission of the infrared rays from radiant heating element 14 relative to radiant heater 10, reflector 15 can be much smaller in width than radiant heaters of the prior art using equivalent linear power density, or using radiant heating elements of equivalent outer perimeter length. The curvilinear side of the metallic triangular profile 23 of radiant heating element 14, which faces outward from radiant heater 10, was chosen to have its curve slanted toward the outside in order to distribute the emitted infrared rays over a wide angle towards the front space.

Figure 7A:
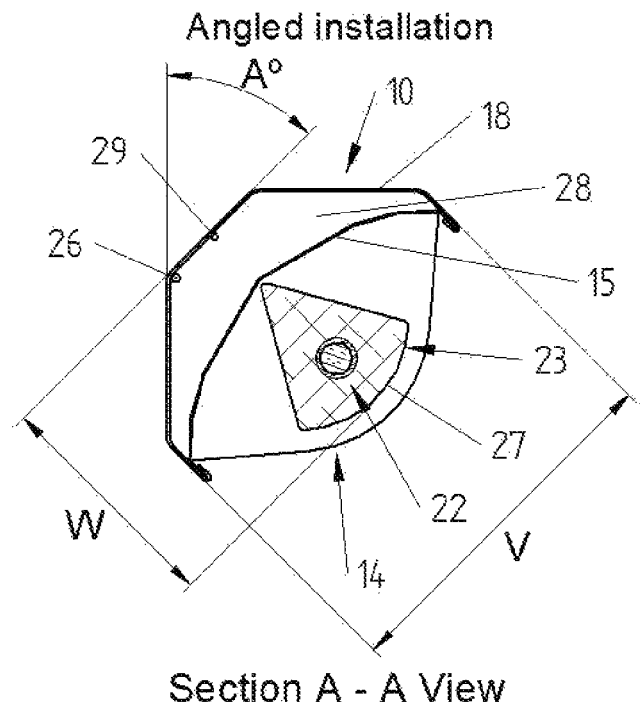
FIG. 7A (FIG. 7A) is a cross-sectional view of the radiant heater of FIG. 5 sectioned perpendicularly across its longitudinal main axis, near the middle, in an angled installation position, showing some of the parts of the heater and the major components of the radiant heating element according to the first avenue of invention.
Figure 7B:
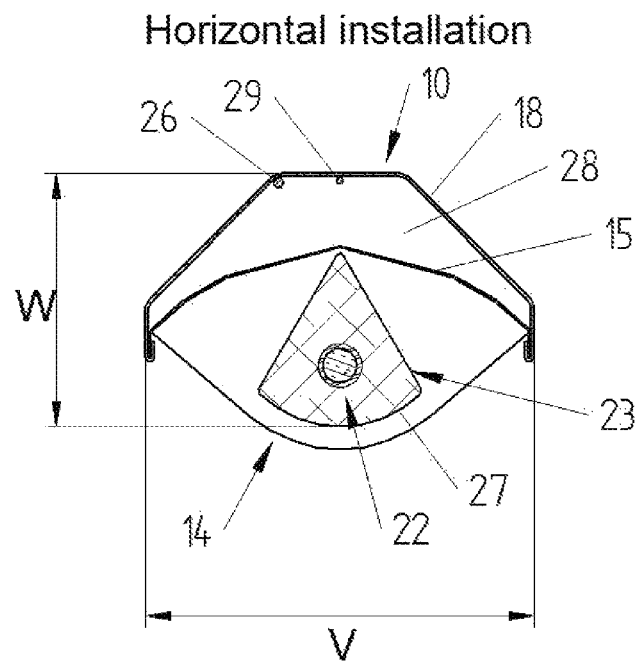
FIG. 7B is a similar cross-sectional view of the radiant heater as in FIG. 7A, except it is positioned for a horizontal installation.

FIG. 7A and FIG. 7B are both a cross-sectional view of radiant heater 10 sectioned perpendicularly across its longitudinal main axis at section A-A in FIG. 5, and showing two different installation positions. FIG. 7A illustrates radiant heater 10 positioned for an installation at an angle for specific applications, especially for indoor space heating, where the radiant heater 10 could be installed at the corner of a wall and a ceiling to radiate the infrared rays downward at an angle. FIG. 7B illustrates radiant heater 10 positioned horizontally to radiate infrared rays fully downward for other specific applications. One can clearly see a typical cross-sectional view of radiant heating element 14, which has partly the shape of a triangle and partly the shape of a curvilinear triangle. The side of radiant heating element 14 facing outward from radiant heater 10 is the side with the curvilinear side. Radiant heating element 14 is composed of a conventional tubular heating element 22, which is inserted into a triangular profile 23 made of metal. The outside surface of the metallic triangular profile 23 is treated or covered with a high emissivity coating 27. The high emissivity coating 27 is a coating or surface treatment that provides a high coefficient of emissivity to the outside surface of triangular profile 23, since metal surfaces have inherently low emissivity coefficients. Because of the triangular cross section of radiant heating element 14, its apex can be positioned at a relatively very close distance to the center and middle of reflector 15. This proximity between a heating element and a reflector could not be done with circular heating elements of the prior art. Enclosure 18 covers completely reflector 15 at its back, while leaving a free area 28 between the two, opposite to where radiant heating element 14 is located. Free area 28 provides the heat insulation and distance from reflector 15 to reduce the surface temperature of enclosure 18. Cross wire 26 can be seen at the top of free area 28. It runs from one end of radiant heater 10 to the other end into each wiring junction boxes 21, to be able to connect radiant heating element 14 at both ends from any wiring junction boxes 21. A high temperature cut-off switch (not shown), using a capillary tube 29 for high temperature detection, is used for safety reasons. The capillary tube 29 is located at the top and inside section of free area 28, in contact with enclosure 18. The high temperature cut-off switch is normally located inside one of the wiring junction boxes 21, and is electrically connected in series with the radiant heating element 14, to detect any excessive temperature of radiant heater 10.

The high emissivity treatment or coating 27 that is mentioned above, and which will be used further for other avenues of invention, can be chosen from these materials: a) Corr-Paint™ CP40xx series and Corr-Paint™ CP40xx-S1 series of colored coatings from Aremco Products Inc., b) HiE-Coat™ 840-M and HiE-Coat™ 840-MS black coatings from Aremco Products Inc., c) Thurmalox® Stove Paint series of colored coatings from Dampney Company, Inc, or d) high oxidation treatment of the metal surface. The best coating to use depends on the type of metal and on the surface temperature of operation of the radiant heating element 14.

Figure 8A:
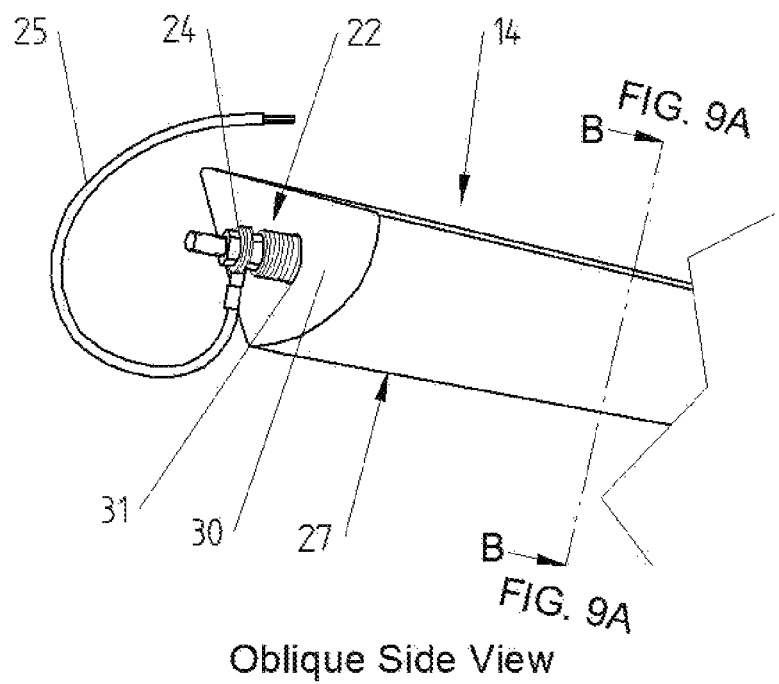
FIG. 8A (FIG. 8A) presents an oblique side view of one end of the radiant heating element from the previous figures, in one of its construction alternatives from the first avenue of invention. In this alternative construction, a standard metallic tubular heating element of current availability, is inserted into a tightly sized hole throughout an extruded or molded metallic profile of triangular cross section. Although not illustrated, a conventional metallic tubular heating element having the two electrical terminals at only one end, can easily be used instead of those with an electrical terminal at each end as shown.

FIG. 8A illustrates an alternative design of radiant heating element 14 of the first avenue of invention in an oblique view. It consists of a conventional tubular heating element 22 inserted into a tightly sized hole throughout the center of an extruded or molded metallic triangular profile 30, where its surface is coated with a high emissivity coating or treatment 27. Wiring terminals 24, at each end of the conventional tubular heating element 22, exit the extruded or molded metallic triangular profile 30 up to at least the beginning of the metallic tubular sheath of conventional tubular heating element 22, in order to prevent short circuits and permit electrical connexion to the power supply. In this example of conventional tubular heating element 22, what is seen exiting the extruded or molded metallic triangular profile 30 are the mica rings and the threaded tip with sets of nuts and washers to tighten the mica rings to the metallic tubular sheath, and to fix the wiring terminal. Conventional tubular heating elements can also be supplied with different insulating ends and terminal options. The conventional tubular heating element 22 can be chosen from the range that is commercially available, which currently is between 5 mm (0.20 inch) to 16 mm (0.625 inch) in diameter. The type of outer sheath for conventional tubular heating element 22 is chosen according to its maximum surface temperature of operation. The material chosen for extruded or molded metallic triangular profile 30 depends upon both its maximum surface temperature of operation, and on the one for the conventional tubular heating element 22. The choice of material for the extruded or molded metallic triangular profile 30 ranges from many types of metals. The material of choice for low power densities of radiant heating element 14, when its inner surface temperature in contact with metallic heating element 22 is below 400° C. (750° F.), is aluminum or one of its alloys. Aluminum is light, relatively low cost and profiles are easily available by the extrusion method. For higher power densities of radiant heating element 14, where aluminum cannot be used for the extruded or molded metallic triangular profile 30, the material can be other metals such as a type of stainless steel or nickel, or nickel alloys, or nickel-iron alloys. These metals can be extruded or molded, but the initial costs are high and the initial volumes to buy are also high.

For the cases where the clearance, between conventional tubular heating element 22 and extruded or molded metallic triangular profile 30, is too great to prevent the movement of conventional tubular heating element 22, a high temperature resistant adhesive-sealant 31 is applied on the ends of the metallic sheath of conventional tubular heating element 22. An alternative method, is to use a longer conventional tubular heating element 22 and tighten a mounting collar at each end against the extruded or molded metallic triangular profile 30. The high temperature resistant adhesive-sealant 31 can be chosen from materials manufactured from metallic powders or fibers, and/or ceramic material powders or fibers, and/or metal oxide powders or fibers, and/or carbon powder or fibers, and/or silicon dioxide powder or fibers; and mixed with a high temperature resistant inorganic binder system such as either a water-dispersed aluminum phosphate binder, or a water-dispersed potassium silicate binder, or other proprietary binders. Such high temperature resistant adhesive-sealants are commercially available and a few types are listed here: from Aremco Products, Inc.: Pyro-Putty® 2400, or Pyro-Putty® 653, or Ceramabond™ 571; and from Cotronics Corp.: Resbond™ 907GF, or Durabond™ 7032, or Durabond™ 954. They require proper cleaning of the substrates and a curing schedule to be effective.

Figure 8B:
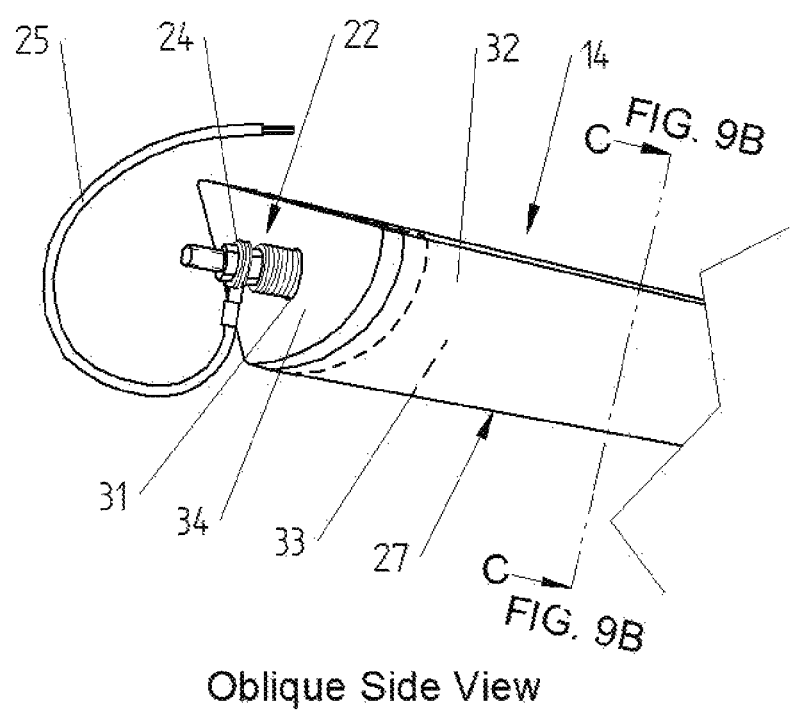
FIG. 8B is similar to FIG. 8A, except it illustrates an alternative design, where a conventional metallic tubular heating element of current availability is inserted into a metal tube formed to a triangular profile, and where a heat conductive filling material is used as the substance to conduct the heat between the heating element and the formed metal tube. In this alternative design of the first avenue of invention, an end plug is inserted at each end of formed metal tube to hold in place the heat conductive filling material.

FIG. 8B displays an alternative design of radiant heating element 14 of the first avenue of invention in an oblique view, where the extruded or molded metallic triangular profile 30 of FIG. 8A is replaced by a formed outer metallic tube 32 and the inner space is filled with a heat conductive material 33. It consists of a conventional tubular heating element 22, equivalent to FIG. 8A, but inserted into a formed outer metallic tube 32 having a triangular profile, and through end plugs 34 having holes for passing the terminating ends 24. The outer surface of formed outer metallic tube 32 is coated with a high emissivity coating or treatment 27. End plugs 34 are made of either mica, or silicone, or ceramic, or metal depending on the temperature at that location, and are either press fitted, or glued, or welded inside formed outer metallic tube 32. Another method, other than the use of end plugs 34, is to employ electrically insulating grommets that are at the ends of conventional tubular heating element 22, with a larger diameter flange next to the formed outer metallic tube 32. The temperature that is generally required at the ends of tubular heating elements, where an electrical terminal is located, is in the range of 60° C. (140° F.) to 200° C. (392° F.) depending on the application, in order to be able to use available electrical wiring. If an adhesive is required for end plugs 34 or for fixing conventional tubular heating element 22 to the end plugs 34, it should be the high temperature resistant adhesive-sealant 31 as listed above. Mounting collars may also be used, as stated in the description of FIG. 8A, to fix conventional tubular heating element 22 to extruded or molded metallic triangular profile 30.

The heat conductive material 33, mentioned above and further down for other avenues of invention, does not need to also have a high electrical resistivity, as it is not in direct contact with the current carrying coiled resistive conductor within conventional and commercial available metallic tubular heating elements, such as conventional tubular heating element 22. The heat conductive material 33 needs to have a relatively high thermal conductivity and be resistant to the operating temperature encountered. The materials that can be used as the heat conductive material 33 are powders or grits of ceramic type materials such as: silicon carbide, aluminum oxide, zirconium oxide, magnesium oxide, aluminum silicate, steatite, cordierite, boron nitride, porcelain and others. Other materials that can be used are: glass type powders or grits, or powders or grits of metals such as stainless steel, and nickel alloys, or powders or grits of graphite, from mixtures of some or all of the above. Good working materials to use are powders or grits of silicon carbide or of aluminum oxide, which are much less expensive than the ones of magnesium oxide. Aside from compressing and elongating the radiant heating element 14 to compact the heat conductive material 33 inside the formed outer metallic tube 32, other methods can be used to perform the same task such as low frequency vibration mechanisms or high frequency vibration equipment. Powdered magnesium oxide is currently the material of choice used for the heat conductive material inside commercially available metallic tubular heating elements, such as conventional tubular heating element 22, because of its high electrical resistivity that is also required.

FIG. 9A shows a cross-sectional view of radiant heating element 14 from section B-B of FIG. 8A. It displays the dimensional parameters of the cross section. For this alternative design of the first avenue of invention, dimensions X and Y both range from 19 mm (0.75 inch) and higher. Their actual dimensions depend on the total power input desired, and more specifically on the size of the radiant heater 10 and its linear watt density, and the watt per surface area of the radiant heating element 14. Angle B extends from 15 degrees to 150 degrees where the optimum range is between 40 to 80 degrees. Angle C is the angle of spread of the outer curvilinear side, when present, of the triangular profile facing the space to heat and typically may range from 30 degrees to 90 degrees. It is tied with the radiant heat coverage required for the application, and on the radiant heat intensity desired at close range. This side of the triangular profile may also be straight in design for particular applications, and hence angle C would not exist.

FIG. 9B exhibits a cross-sectional view of radiant heating element 14 from section C-C of FIG. 8B. It depicts the formed outer metallic tube 32 making the outer shell of the radiant heating element 14, and the heat conductive material 33 surrounding the conventional tubular heating element 22. The same dimensional specifications stated in the description of FIG. 9A are applicable to the alternative design of FIG. 8B and FIG. 9B.

FIG. 10 illustrates different basic and general versions of the triangular profile that radiant heating element 14 can have, and that would provide the advantages listed for this avenue of invention. For all versions, a mixture of one with another, or more than another would still constitute a workable radiant heating element 14 that would also provide innovations over the prior art. Profile a) depicts the profile, which has been used in the text so far, and which has the shape of a triangle for the two upper sides and a curvilinear line for the lower and emitting side. This shape is the optimum one for most applications. The next best shape is the one in profile b), which is purely a straight triangle. Choosing a particular profile different than the one used so far in the text and in the figures, requires a different design for reflector 15 and for the other components of radiant heater 10, but the general advantages of this invention over the prior art will prevail.

Prototypes were made similar to radiant heater 10 with an radiant heating element 14, equivalent to the one of FIG. 8A and FIG. 9A, where the extruded or molded metallic profile 30 was made up of an extrusion of aluminum alloy 6005A, and tested for temperatures in a typical space heating application. The reflector 15 used was a highly specular mirror finish sheet made from a vapor phase deposition process of an anodized and hardened aluminum 1090 alloy having a total reflectance of approximately 0.95. The high emissivity coatings 27 used were Corr-Paint™ CP4040-S1 white colored coating from Aremco Products Inc, and Thurmalox® Stove Paint white colored coating no. 290 from Dampney Company, Inc. It was estimated from thermocouple and infrared thermometer measurements that Thurmalox® Stove Paint white colored coating no. 290 has an emissivity of approximately 0.95, and that Corr-Paint™ CP4040-S1 white colored coating has an emissivity of approximately 0.90. The outer surface of enclosure 18 was coated with Thurmalox® Stove Paint white colored coating no. 290. Radiant heater 10 was installed at an angle C of 45 degrees similar to FIG. 7A at the corner of a wall and a ceiling, both made up of gypsum board, with small clearances to both the wall and the ceiling.

Here were the parameters of the prototype in their respectful order:

Dimensions V and W of FIG. 7A: 108 mm (4.25 in) and 73.5 mm (2.895 in)

Angle A of FIG. 7A: 45 degrees

Dimensions X and Y of FIG. 9A: 45.4 mm (1.787 in), 48.1 mm (1.895 in)

Angles B and C of FIG. 9A: 60 degrees and 90 degrees

Direct emission angle of radiant heating element 14: 33%

Length of radiant heating element 14: 221 cm (87 in)

Heated length of radiant heating element 14: 208 cm (82 in)

Effective radiating length of radiant heating element 14: 218 cm (86 in)

Length of outer perimeter of triangular profile 30: 140.9 mm (5.546 in)

Total power input: 1200 watts

Heated length power density of radiant heating element 14: 0.408 watts/cm$^2$ (2.63 watts/in$^2$)

Total reflectance of reflector 15: 0.95

Estimated emissivity of surface of heating element 14: 0.95

Estimated emissivity of the surrounding and facing surfaces: 0.90

Clearance space between radiant heater 10 and wall: 5 mm (3/16 in)

Clearance space between radiant heater 10 and ceiling: 5 mm (3/16 in)

Heating element surface temperatures were measured using an infrared thermometer, and wall and ceiling temperatures with thermocouples. The temperature measurements and observations were:

Room ambient temperature: 21° C. (70° F.)

Middle surface temperature of radiant heating element 14: 255° C. (491° F.)

Average surface temperature of radiant heating element 14: 235° C. (455° F.)

Steady state wall temperatures behind radiant heater 10: Below 70° C. (158° F.)

Steady state ceiling temperatures above radiant heater 10: Below 85° C. (185° F.)

Steady state ceiling temperatures just ahead of radiant heater 10: Below 90° C. (194° F.)

Radiant heater 10 operated for several weeks without the white colored high emissivity coatings on radiant heating element 14 turning yellowish.

Using Stefan-Boltzmann equation rearranged for the transfer of energy between the heating apparatus and the surroundings, and the equation for calculating the corrected radiant heat efficiency for the radiant heater when considering the effect of the reflector, as explained previously in the Background of the Invention section, and using the parameters and measurements from the list above, the following can be calculated:

Radiant heat output from radiant heating element 14: 886 watts

Radiant heat efficiency of radiant heating element 14: 73.8%

Radiant heat efficiency of radiant heater 10: 71.3%

Radiant heat output from radiant heater 10: 856 watts

Convective heat output from radiant heater 10: 344 watts

This radiant heat efficiency is better than any other radiant heater used for low ceiling indoor spaces. It is at least:

138% higher than a conventional cove heater

43% better than a low ceiling panel or a European wall radiator with perforated front panel 27% higher than a heated floor installation.

Overall, in designing a radiant heater such as radiant heater 10 for a particular application, the dimensions of the unit will depend on the dimensions of the radiant heating element and on the heat output required. From work on previous tests and from the test and measurements of the prototype above, the heated length power density of the radiant heating element needed to obtain an element middle temperature of approximately 250° C. (480° F.) is about 0.40 watts/cm$^2$ (2.6 watts/in$^2$). Hence, the width and the length of the radiant heater depend on the length of the outer perimeter of the chosen profile for the radiant heating element, and on the desired power input. It has been estimated from other prototypes and tests, that the power density of radiant heating element 14 required to have radiant heater 10 of reasonable size, and to have a maximum surface temperature of 500° C. (930° F.) at the middle of radiant heating element 14, temperature at which there is no light emitted, is in the range of 1.9 to 2.1 watts per square centimeter (12 to 13.5 watts per square inch) of heated length.

Figure 11:
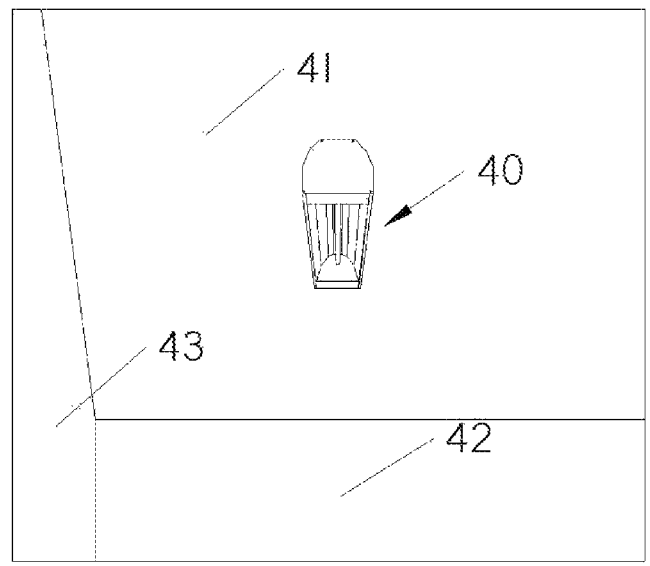
FIG. 11 (FIG. 11) is an illustration of an oblique view from below of a radiant heater, fixed to the ceiling of a high ceiling space, and containing a radiant heating element according to the second avenue of invention.

Referring to FIG. 11, a commercial space with a high ceiling is illustrated, showing an oblique view from below of radiant heater 40 installed directly on the ceiling 41 near wall 42 and wall 43.

Figure 12:
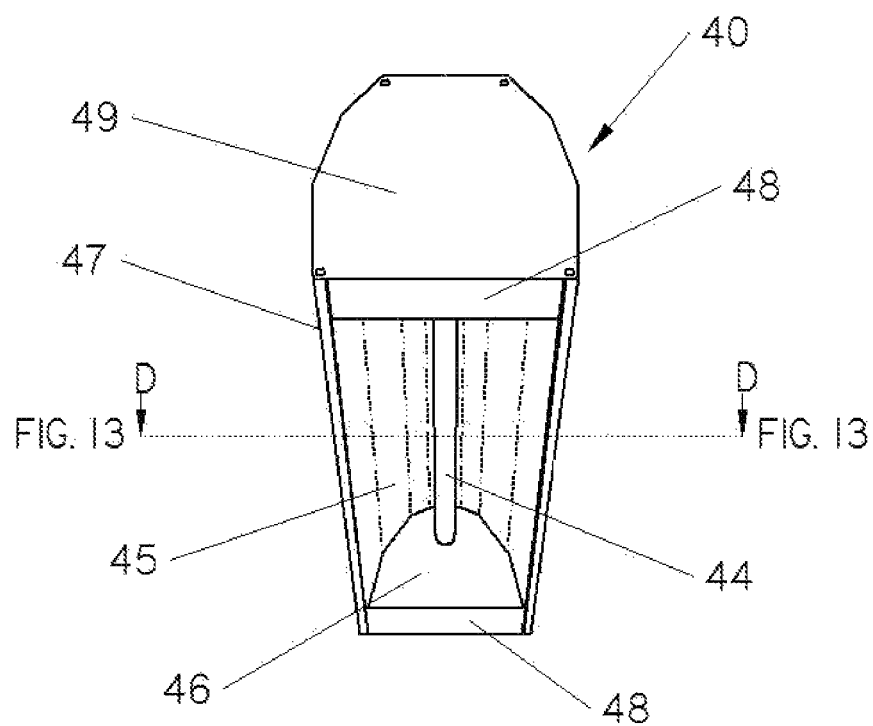
FIG. 12 displays radiant heater of FIG. 11 from an oblique bottom view and shows its major outer components.

FIG. 12 shows an oblique view from below of radiant heater 40 and depicts its major components that can be seen from the outside. In the center of radiant heater 40, is an radiant element 44 according to the second avenue of invention. It is surrounded at its back and on the parallel sides of its main axis by a primary reflector 45, and surrounded at both ends by end reflectors 46. The whole assembly of radiant heater 40 is held in place and covered by a metal enclosure 47 and end covers 49 at each end. An electrical junction box is provided at each end under junction box covers 48 and end covers 49.

Figure 13:
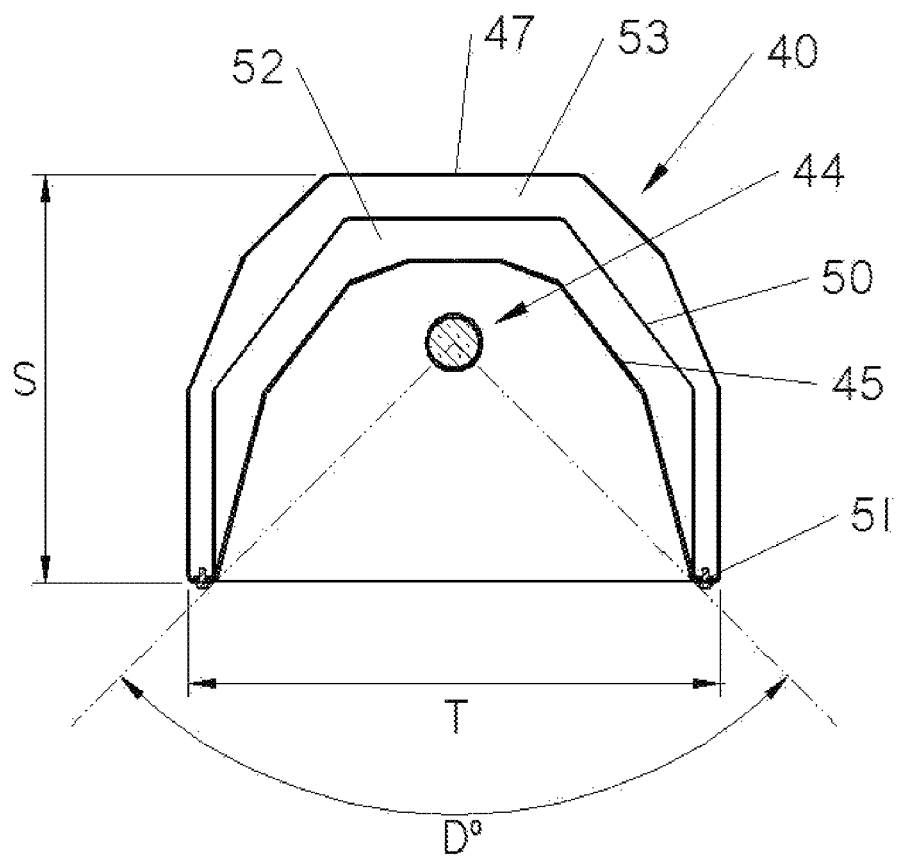
FIG. 13 is a cross-sectional view of radiant heater of FIG. 12 sectioned perpendicularly across its longitudinal main axis, near the middle, showing its basic design and parts.

FIG. 13 is a cross-sectional view of radiant heater 40 at section D-D of FIG. 12, sectioned perpendicularly across its longitudinal main axis, in the middle, showing its main inner components and its basic construction. The radiant heating element 44 is in the center and surrounded along its main axis on top and on the sides by primary reflector 45. Primary reflector 45 is designed according to the law of reflection, in order to direct the infrared rays in the direction and the angle of diffusion D that is required for the application. In this design the angle of direct emission of radiant heating element 44 is the same as the angle of diffusion D of primary reflector 45. Surrounding the back of primary reflector 45 at a distance behind it, is back reflector 50 which is added and designed also according to the law of reflection, to reflect the infrared heat emitted from the back of primary reflector 45 back to itself, and to restrain the convective heat generated in air cavity 52. Enclosure 47 is intended to cover the back of the whole assembly of radiant heating element 44, primary reflector 45 and back reflector 50, and leave a space in such a way to create air cavity 53, which will restrain the heat emanating from back reflector 50. In this particular design, fasteners 51 secure the whole assembly of primary reflector 45, back reflector 50 and enclosure 47. The use of back reflector 50 reduces to a large extent the surface temperatures of the enclosure 47, hence permitting radiant heater 40 to be installed in close proximity to a wall or ceiling made of combustible materials. In FIG. 13, the angle of diffusion D shown has an angle of 90 degrees, and if one chooses to increase this angle, dimension S can be reduced to have a smaller radiant heater 40. By reducing the distance between radiant heating element 44 and reflector 45, radiant heater 40 will be reduced in both S and T dimensions.

Figure 14:
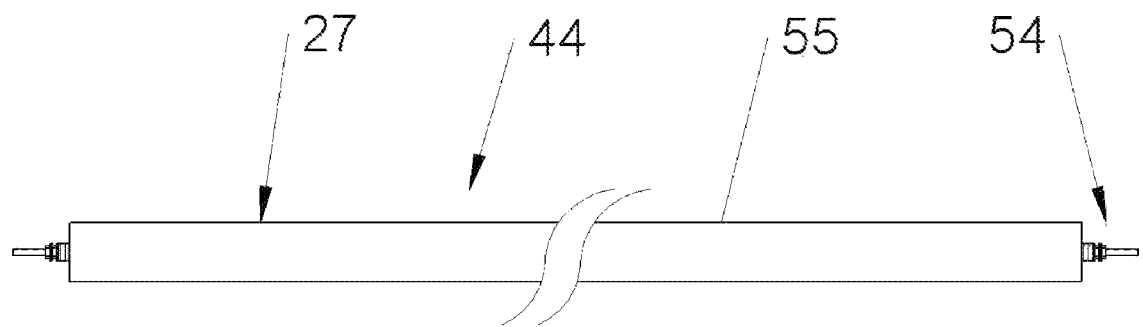
FIG. 14 (FIG. 14) is an illustration of the radiant heating element appearing in FIG. 12 and FIG. 13, exhibiting its major outer components. Although not illustrated here, a radiant heating element having the two electrical terminals at only one end, can also be made easily, as an alternative of the second avenue of invention.

FIG. 14 illustrates an radiant heating element 44 according to the second avenue of invention, and is consisting of a conventional metallic tubular heating element 54 (now on named as: conventional tubular heating element 54), that is inserted into a hollow metallic cylinder, or multitude of hollow metallic cylinders, in order to increase its outer diameter. The outermost hollow metallic cylinder 55 is what is seen in FIG. 14 over the conventional tubular heating element 54, which is identified by its electrical end terminal. A high emissivity treatment or coating 27, equivalent to the previous descriptions of FIG. 7A and FIG. 7B, covers the whole length and perimeter of the outer surface of the outermost hollow metallic cylinder 55.

Figure 15A:
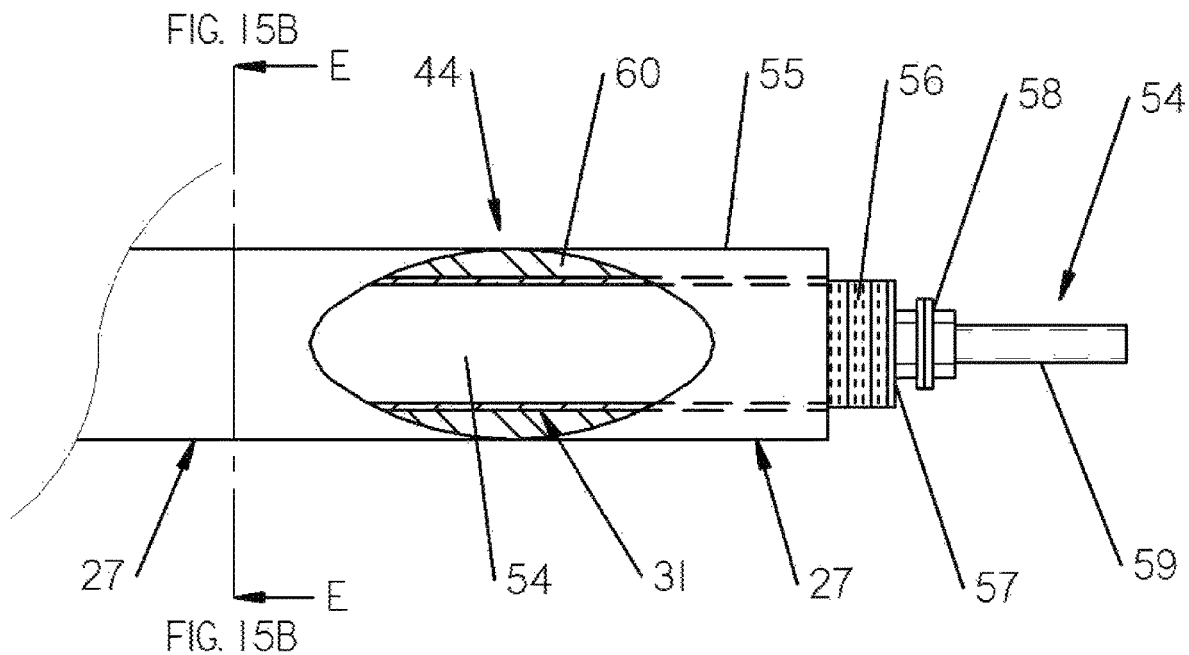
FIG. 15A (FIG. 15A) and FIG. 15B (FIG. 15B) display an alternative construction of the second avenue of invention, where
Figure 15B:
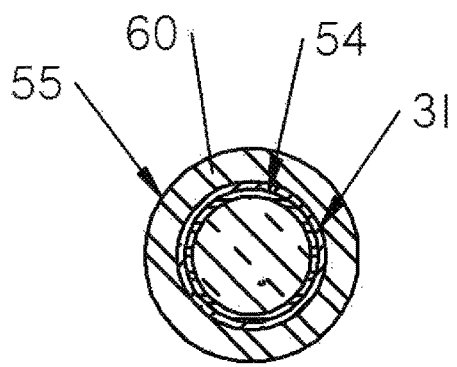

FIG. 15A and FIG. 15B display an alternative construction of the second avenue of invention, where FIG. 15A shows a front view of one end of radiant heating element 44, with a partial view of the inside components within the elliptic cutaway in the center, and where FIG. 15B exposes the cross-sectional view of section E-E of FIG. 15A. Firstly, in the center and inside, a conventional tubular heating element 54 has been inserted into a metal tube, or metal pipe, or more generally into a hollow metallic cylinder 55, to increase the outside diameter of radiant heating element 44, in order to obtain the desired heating power per surface area for a particular length that may be required for an application. A typical conventional tubular heating element 54 is shown with its electrically insulating grommets 56 consisting of mica rings. Other types of electrically insulating grommets 56 can be used, such as ceramic inserts or silicon inserts, depending on the application and on the operating temperature. At each end of conventional tubular heating element 54 is an electrical end terminal, consisting of a set of a metal nut and washer 57 to tighten the electrically insulating grommets 56 to the metallic sheath of conventional tubular heating element 54, and a set of metal washers and metal nut 58 to tighten the electrical power supply terminal along the threaded end 59. Other types of electrical terminals are available from manufacturers of conventional and commercially available metallic tubular heating elements, but these are not shown, since they do not interfere with this invention, and can also be used. This alternative of the second avenue of invention modifies a conventional tubular heating element 54 by adding an outermost hollow metallic cylinder 55 over it, as can be seen by its cross section 60, over its whole length to the other end, and up to near the electrically insulating grommets 56, similar to the end shown. For this alternative design of the second avenue of invention, where the space is small between the conventional tubular heating element 54, and the outermost hollow metallic cylinder 55, a high temperature resistant adhesive-sealant 31, equivalent to the description of FIG. 8A, is applied as the binder and for the conduction of heat between the conventional tubular heating element 54 and the hollow metallic cylinder 55. Still another part of this avenue of invention, is the addition of a high emissivity treatment or coating 27 over the whole length of the outer surface of hollow metallic cylinder 55. This high emissivity treatment or coating 27 will provide an increase in the radiant heat efficiency of radiant heater 40, as metals have an inherently low coefficients of emissivity.

Figure 16A:
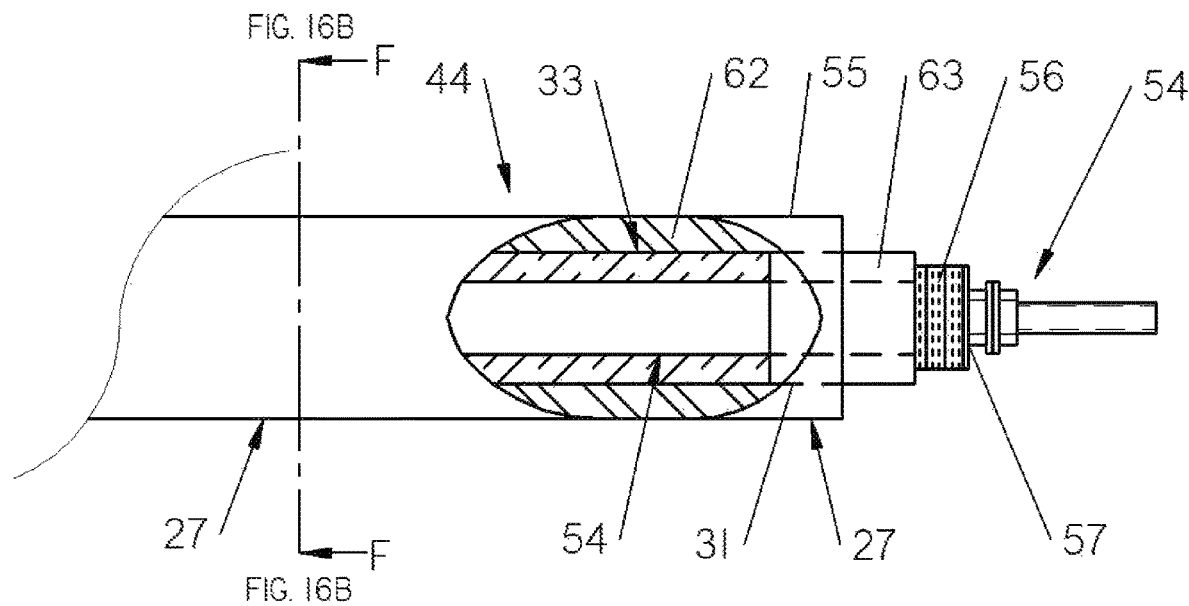
FIG. 16A and FIG. 16B are similar to FIG. 15A and FIG. 15B, respectively, except for the greater clearance between the hollow metallic cylinder and the conventional metallic tubular heating element of current availability. It is another alternative construction of the second avenue of invention.
Figure 16B:
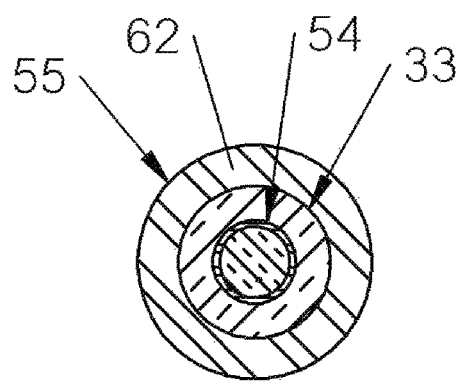

FIG. 16A and FIG. 16B expose another alternative to the second avenue of invention which is equivalent in design as the one in the descriptions of FIG. 15A and FIG. 15B, except for the replacement of the high temperature resistant adhesive-sealant 31 by a heat conductive material 33. This is favorable when the space between the conventional tubular heating element 54, and the outermost hollow metallic cylinder 55 (with its cross section 62) is wide enough for the use such a heat conductive material 33. This heat conductive material 33 has mentioned previously does not need to also have a high electrical resistivity, as it is not in direct contact with the current carrying coiled resistive conductor within the conventional tubular heating element 54. The material to use can be chosen from the list appearing in the description of FIG. 8B. End plug 63 is used at each end of outermost hollow metallic cylinder 55, to hold in place the heat conductive material 33 and to fix the outermost hollow metallic cylinder 55 to the assembly. Another method, other than the use of end plugs 63, is to employ electrically insulating grommets, equivalent to electrically insulating grommets 56, but with a larger diameter flange next to the outer hollow metallic cylinder 55. Aside from compressing and elongate the radiant heating element 44 to compact the heat conductive material 33 inside the outer hollow metallic cylinder 55, other methods can be used to perform the same task such as low frequency vibration mechanisms or high frequency vibration equipment. End plugs 63 are held into position with the aid of sets of metal nut and washer 57, and with the aid of the high temperature resistant adhesive-sealant 31 applied on the outer perimeter of end plugs 63. The temperature that is generally required at the ends of tubular heating elements, where an electrical terminal is located, is in the range of 60° C. (140° F.) to 200° C. (392° F.) depending on the application, in order to be able to use available electrical wiring. The material used for end plugs 63 need to withstand the operating temperature at its location, and can be chosen from the same types of materials that are used for electrically insulating grommets 56, and can be made from an electrically insulating material that can withstand the operating temperatures at that location, or from metal, and they are generally made up of either mica, ceramic or silicon, depending on the application and on the operating temperature.

Figure 17A:
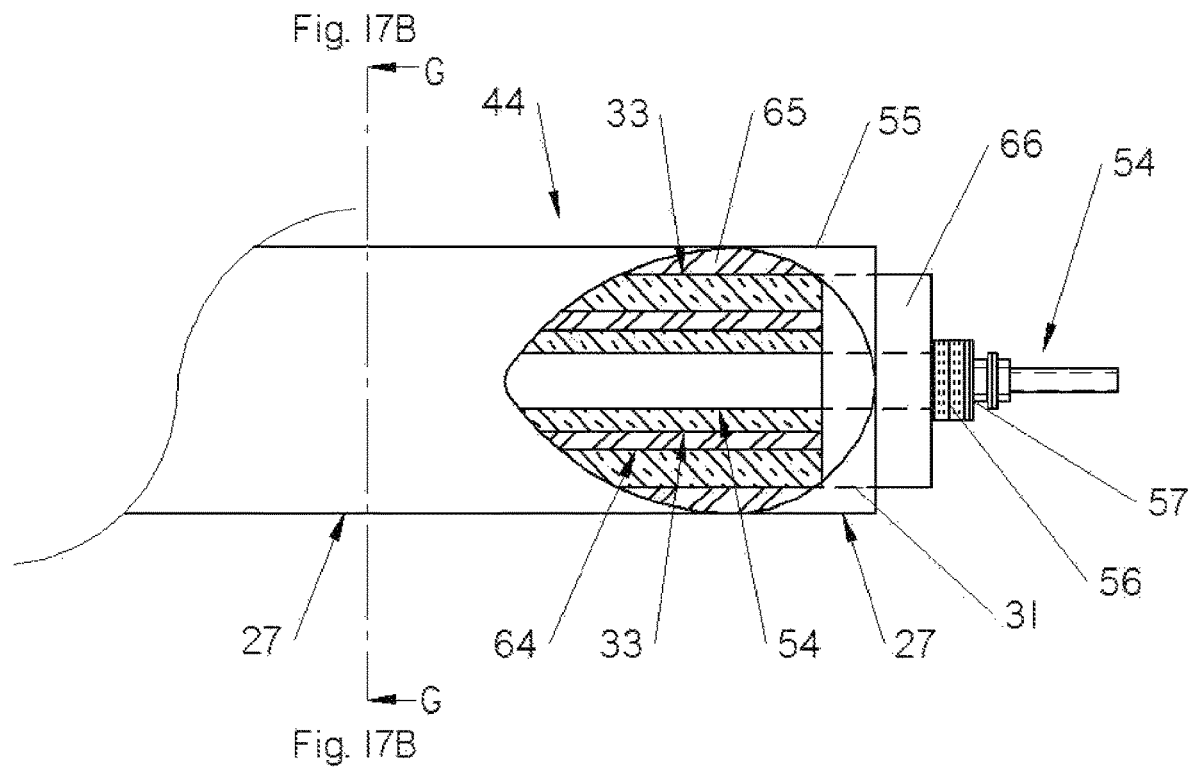
FIG. 17A, and FIG. 17B are similar to FIG. 16A and FIG. 16B, respectively, except for two hollow metallic cylinders used to increase the outside diameter of a conventional metallic tubular heating element. This construction is another alternative design to the second avenue of invention.
Figure 17B:
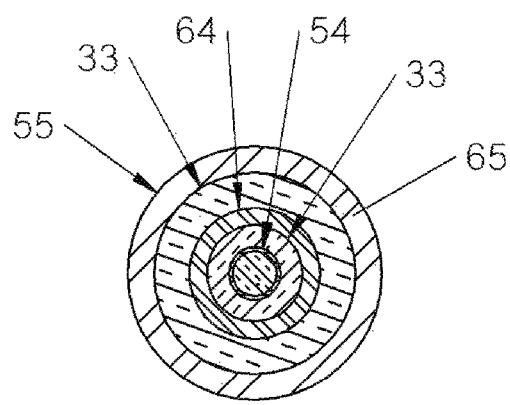

FIG. 17A and FIG. 17B illustrate another alternative to the second avenue of invention which is equivalent in design as the one in the descriptions to FIG. 16A and FIG. 16B, except where a multitude of hollow metallic cylinders are laid inside one another to increase the outside diameter of radiant heating element 44, in order to obtain the desired heating power per surface area for a particular length that may be required for an application. As an example, FIG. 17A and FIG. 17B display the same components for the conventional tubular heating element 54, except two hollow metallic cylinders 64 and 65 have been used to increase its outer diameter. The conventional tubular heating element 54, is overlapped over its whole length, up to near the electrically insulating grommets 56, with a hollow metallic cylinder 64, and a heat conductive heat conductive material 33 is filled between them. The same procedure is repeated, where hollow metallic cylinder 65 covers the whole length of hollow metallic cylinder 64, and a heat conductive material 33 is filled between them. A bigger end plug 66 is used at each end of outermost hollow metallic cylinder 55 and its cross section 65, to hold in place the heat conductive material 33 of each interstice, and to hold also in place innermost hollow metallic cylinder 64, and to fix the outermost hollow metallic cylinder 55 to the assembly. End plugs 66 are equivalent in composition as end plugs 63. In the cases where the clearance is small between the innermost hollow metallic cylinder 64 and the conventional tubular heating element 54, and/or between the innermost hollow metallic cylinder 64 and the outermost hollow metallic cylinder 65, a high temperature resistant adhesive-sealant 31 can be applied instead of the heat conductive material 33.

Figure 18:
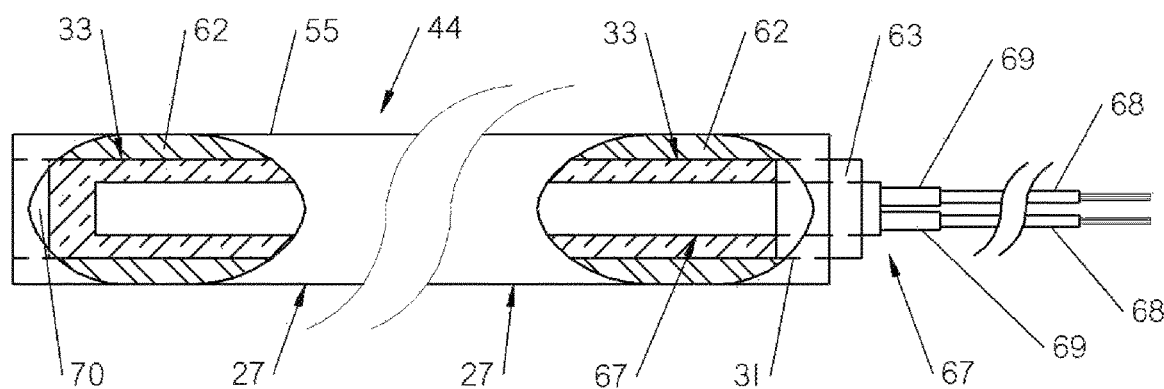
FIG. 18 points out the possibility of using a conventional metallic tubular heating element with the two electrical terminals on the same end (a single-ended metallic tubular heating element) in any of the alternative constructions of FIG. 15A, FIG. 16A and FIG. 17A.

FIG. 18 is shown to illustrate that a conventional, and commercially available, metallic tubular heating element having the electrical terminals at only one of its ends, can also be used as the heating element, and as an alternative, in any of the designs described in FIG. 15A, FIG. 15B, and FIG. 16A, FIG. 16B, and FIG. 17A, FIG. 17B, and in any combinations of them. FIG. 18 shows the same construction as is defined in FIG. 16A and FIG. 16B, except for the new components that are used with such a heating element, such as conventional tubular heating element 67 shown. These new components are the two lead wires 68, the strain relief shrinkable tubes 69, and an end cap 70. End cap 70 can either be a welded metal insert, or a cap made of equivalent materials as for end plugs 63.

Prototypes were made similar to radiant heater 40 for a typical application to test for component temperatures. One prototype was fabricated with a radiant heating element 44, equivalent to the one of FIG. 16A and FIG. 16B, where the hollow metallic cylinder 55 and 62 was a stainless steel tube made of alloy 304, and the heat conductive material 33 used was a powder of high purity silicon carbide of green color and of grit size F150. Half of the outer surface of the hollow metallic cylinder 55 was applied with Corr-Paint™ CP4000-S1 black colored coating from Aremco Products Inc, and the other half with Thurmalox® Stove Paint flat black colored coating no. 270 from Dampney Company, Inc. It was estimated from thermocouple and infrared thermometer measurements that Thurmalox® Stove Paint flat black colored coating no. 270 has an emissivity of approximately 0.95, and that Corr-Paint™ CP4000-S1 black colored coating has an emissivity of approximately 0.90. Reflector 45 used was a highly specular mirror finish sheet made from a vapor phase deposition process of an anodized and hardened aluminum 1090 alloy having a total reflectance of approximately 0.95. The outer surface of enclosure 47 was coated with Thurmalox® Stove Paint white colored coating no. 290. Radiant heater 40 was suspended from the ceiling in a position similar to FIG. 13.

Here were the parameters of the prototype in their respectful order:
  Dimensions S and T from FIG. 13: 250 mm (9.86 in) and 192 mm (7.54 in)
  Angle of diffusion D of reflector 45 from FIG. 13: 90 degrees
  Direct emission angle of radiant heating element 44: 90 degrees
  Outer diameter of radiant heating element 44: 25.4 mm (1.0 in)
  Total length of radiant heating element 44: 102 cm (40 in)
  Heated length of radiant heating element 44: 84 cm (33.1 in)
  Effective radiating length of radiant heating element 44: 98 cm (38.5 in)
  Total power input: 1500 watts
  Heated length power density of radiant heating element 44: 2.23 watts/cm$^2$ (14.4 watts/in$^2$)
  Total reflectance of reflector 45: 0.95
  Estimated emissivity of surface of heating element 44: 0.95
  Estimated emissivity of the surrounding and facing surfaces: 0.90

Heating element surface temperatures were measured using an infrared thermometer, and radiant heater temperatures with thermocouples. The temperature measurements and observations were:
  Room ambient temperature: 21° C. (70° F.)
  Middle surface temperature of radiant heating element 44: 540° C. (1004° F.)
  Average surface temperature of radiant heating element 44: 500° C. (932° F.)
  Steady state surface temperature at top of enclosure 47 of radiant heater 40: Below 50° C. (122° F.)

Radiant heater 40 operated for several weeks without the black colored high emissivity coatings on radiant heating element 44 flacking or discoloring.

If one chooses to increase the angle of diffusion D, dimension Y will be reduced, and it is believed that the outer surface temperatures of enclosure 47 should not be much different.

Using Stefan-Boltzmann equation rearranged for the transfer of energy between the heating apparatus and the surroundings, and the equation for calculating the corrected radiant heat efficiency for the radiant heater when considering the effect of the reflector, as explained previously in the Background of the Invention section, and using the parameters and measurements from the list above, the following can be calculated:
  Radiant heat output from radiant heating element 44: 1329 watts
  Radiant heat efficiency of radiant heating element 44: 88.6%
  Radiant heat efficiency of radiant heater 40: 85.3%
  Radiant heat output from radiant heater 40: 1279 watts
  Convective heat output from radiant heater 40: 220 watts This radiant heat efficiency is better than many other radiant heaters used for high ceiling indoor spaces and for outdoor spot heating. It is at least:
  55% better than heaters using gas-fired heated tubes
  31% higher than heaters using quartz tubes
  14% better than heaters using the best of conventional metallic tubular heating elements
  55% higher than high temperature ceiling panels Overall, in designing a radiant heater such as radiant heater 40 for a particular application, the dimensions of the unit will depend on the dimensions of the radiant heating element and on the heat output required. From work on previous tests and from the test and measurements of the prototype above, the heated length power density of the radiant heating element needed to obtain an element middle temperature of approximately 500° C. (930° F.) is about 2.2 watts/cm$^2$ (14 watts/in$^2$). It has been estimated from other prototypes and tests, that the power density of radiant heating element 44 required to have radiant heater 40 of reasonable size, and to have a maximum surface temperature of 250° C. (480° F.) at the middle of radiant heating element 44, is in the range of 0.46 to 0.54 watts per square centimeter (3 to 3.5 watts per square inch) of heated length. Hence, the width and the length of the radiant heater depend on the outer diameter of the radiant heating element, the desired power input, the distance between the heating element and the reflector, and on the desired angle of diffusion for the reflector.

Figure 19A:
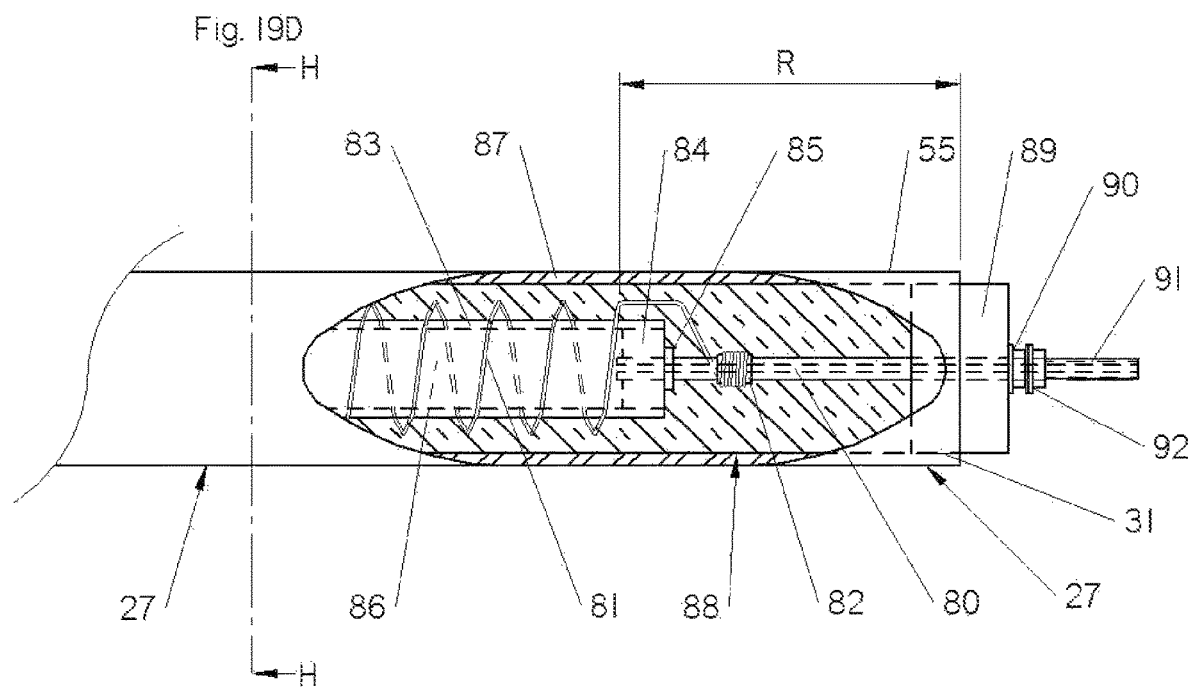
FIG. 19A (FIG. 19A) illustrates a front view of one end of a heating element, according to an alternative design of the third avenue of invention. It shows a partial view of the inside components within the elliptic cutaway in the center, of a new design of metallic tubular heating element with electrical terminals at each end, where heating elements of large sizes or cross sections are required. The design is based on the use of two metallic tubes to create an interstice, where the coiled resistance conductor and the electrically insulating material are located.

FIG. 19A displays a front perspective view of one end of a new innovative design of a heating element, now on named as a tubular and interstice heating element, with a partial view of the inside components within the elliptic cutaway in the center, and it is defined as the third avenue of invention. The profile of the outer perimeter of its cross section can be circular or triangular depending on the application. The basic types of profiles can be seen by the cross-sectional views of section H-H in FIG. 19D. This design is based on the use of two metal tubes to create an interstice, where the coiled resistance conductor 81 and the electrically insulating material 88 are located, and arranged to have a threaded electrical terminal 91 at each end. This new design can be used to replace the ones described in the previous figures for heating elements 14 and 44. It is composed of a hollow cold stem 80 extending from threaded electrical terminal 91 on the outside, to the electrically insulating grommets 84 of the inner metallic tube 83. A coil junction 82 on hollow cold stem 80 is where the coiled resistive conductor 81 is attached, extends over the inner metallic tube 83, progresses between it and the outer metallic tube 87, and to the other end of the tubular and interstice heating element, into a similar arrangement. The space between the inner metallic tube 83, the hollow cold stem 80 and the outer metallic tube 87 is filled with electrically insulating material 88. Electrically insulating material 88 is a powder or grit of a material that needs to have a high electrical resistivity, a relatively high thermal conductivity and a resistance to the operating temperatures. The high electrical resistivity is required because of its contact with the coiled resistive conductor 81, which carries the electrical current. Generally, the materials that fulfill this task are powders or grits of a ceramic type material, such as magnesium oxide which is currently the material mostly used by manufacturers for this task. Aside from compressing and elongateing the tubular and interstice heating element to compact the electrically insulating material 88 inside the outer metallic tube 87, other methods can be used to perform the same task such as low frequency vibration mechanisms or high frequency vibration equipment. At each end of inner metallic tube 83 is an electrically insulating grommet 84, which provides support for hollow cold stem 80 and prevents leakage of electrically insulating material 88 into the inner metallic tube 83. Inside inner metallic tube 83 is plain air 86, which can adjust its pressure from the heating and cooling cycles through the center hole of hollow cold stems 80. Cold stem shoulder 85 fixes both the inner metallic tube 83 and the electrically insulating grommet 84 into position at each end of the tubular and interstice heating element. If required, a high temperature resistant adhesive-sealant 31, which is used in the description of FIG. 8A, can also be used to provide adhesion between electrically insulating grommets 84 and the inner metallic tube 83, and between the electrically insulating grommets 89 and the outer metallic tube 87. Electrically insulating grommets 84 and 89 need to be made from an electrically insulating material that can withstand the operating temperatures at their locations, and they are generally made up of either mica, ceramic or silicon, depending on the application and on the operating temperature. The temperature that is generally required at the ends of tubular heating elements, where an electrical terminal is located, is in the range of 60° C. (140° F.) to 200° C. (392° F.) depending on the application, in order to be able to use available electrical wiring. It is possible to adjust the surface temperature of the end of the outer metallic tube by fixing the length of the hollow metallic cold stem within the outer metallic tube by considering the length R in FIG. 19A. Still another part of the third avenue of invention, is the addition of a high emissivity treatment or coating 27 over the whole length of the outer surface of outer metallic tube 87. This high emissivity treatment or coating 27 can be chosen from the materials listed in the description of FIG. 7A and FIG. 7B above, and will provide an increase in the radiant heat efficiency of the tubular and interstice heating element and of radiant heaters such as radiant heaters 10 and 40. At each end of the tubular and interstice heating element, the threaded electrical terminal 91 is threaded at the end to provide retention of electrically insulating grommet 89 to the outer metallic tube 87, and prevention of the movement of the inner components by the use of a set of metallic nut and washer 90. Electrical connections to the power supply are made using the set of metallic nut and washers 92 at each end of the tubular and interstice heating element. The distance R is chosen according to the application and will depend on the power input density, the surface temperature of the outer metallic tube 87 and on the desired temperature at the location of each threaded electrical terminal 91.

Figure 19B:
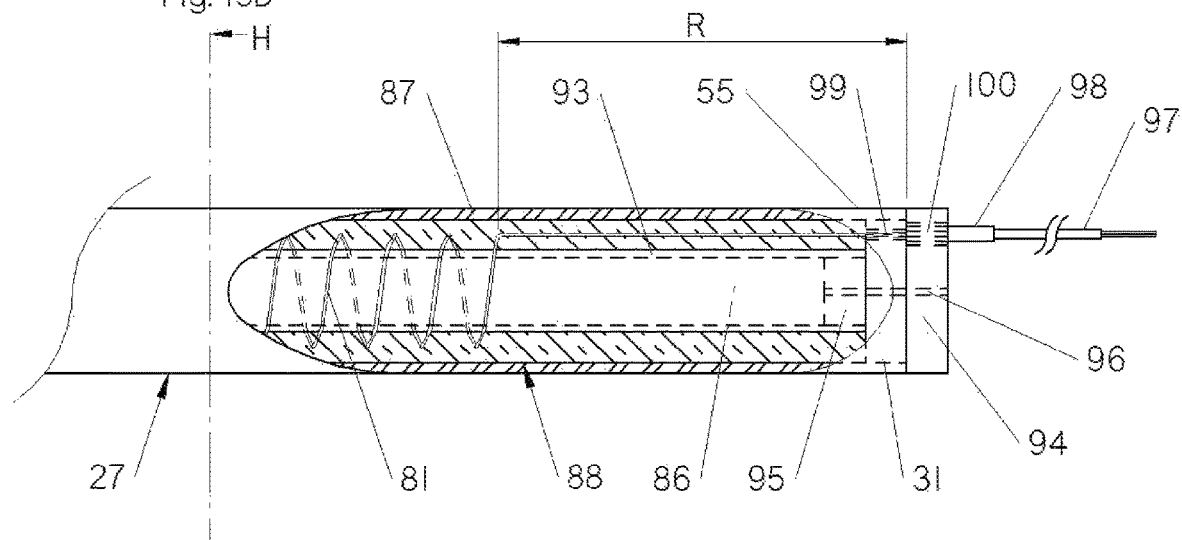
FIG. 19B (FIG. 19B) shows a front view of one end of an a heating element, according to another alternative design of the third avenue of invention. It shows a partial view of the inside components within the elliptic cutaway in the center. It is similar to the one of FIG. 19A, except for how the coiled resistive conductor is connected to the outside using a lead wire, instead of a cold stem with a threaded electrical terminal.

FIG. 19B illustrates a front perspective view of one end of an alternative design for the new innovative tubular and interstice heating element of FIG. 19A, with a partial view of the inside components within the elliptic cutaway in the center. The profile of the outer perimeter of its cross section can also be circular or triangular depending on the application. The basic types of profiles can be seen by the cross-sectional views of section H-H in FIG. 19D. This design is equivalent to the one defined in the description of FIG. 19A, except for the hollow cold stem 80 and the attached components to it at each end, basically replaced by a lead wire 97 and a longer inner metallic tube 93. The coiled resistive conductor 81 is crimped or welded to the conductor of lead wire 97 at a holed location 99 within electrically insulating grommet 94. Lead wire 97 is covered with a shrinkable tubing 98, which extends into the enlarged holed location 99, in electrically insulating grommet 94, where a mid-temperature resistant adhesive-sealant 100 is injected to seal the holed location 99, and fixes lead wire 97 to the electrically insulating grommet 94. Electrically insulating grommets 94 need to meet the same requirements and made from the same choice of materials, as electrically insulating grommets 89 in the description of FIG. 19A above. Shrinkable tubing 98 acts as strain relief protection for lead wire 97. Shrinkable tubing 98 and mid-temperature resistant adhesive-sealant 100 are both made from polymeric materials that need to withstand the operating temperatures at those locations. Mid-temperature resistant adhesive-sealant 100 also requires to provide a good adhesion to both shrinkable tubing 98 and to electrically insulating grommet 94. Many materials available on the market can be used for mid-temperature resistant adhesive-sealant 100 such as certain types of epoxies, silicones, and hot-melt plastics. Materials that can be used for shrinkable tubing 98, depending on the operating temperatures, are tubes from cross-linked polyethylene, or cross-linked polyvinyl chloride, or from cross-linked fluoropolymers. In order to prevent premature breakage of the coiled resistive conductor 81 at holed location 99, where it is crimped or welded to the conductor of lead wire 97, coiled resistive conductor 81 is formed into a loop and crimped or welded side by side, rather than end to end. The inner metallic tube 93, at each end of the tubular and interstice heating element, extends and is fixed into position by the fitted section 95 of electrically insulating grommet 94. Inside inner metallic tube 93 is just plain air 86. In each of electrically insulating grommet 94 is an air hole 96, which adjusts the pressure of plain air 86 from the heating and cooling cycles of the tubular and interstice heating element. It is possible to adjust the surface temperature of the end of the outer metallic tube by fixing the length of the straight portion of coiled resistive conductor 81 from and within the end of the outer metallic tube by considering the length R in FIG. 19B. This new design can also be used to replace the ones described in the previous figures for radiant heating elements 14 and 44.

Figure 19C:
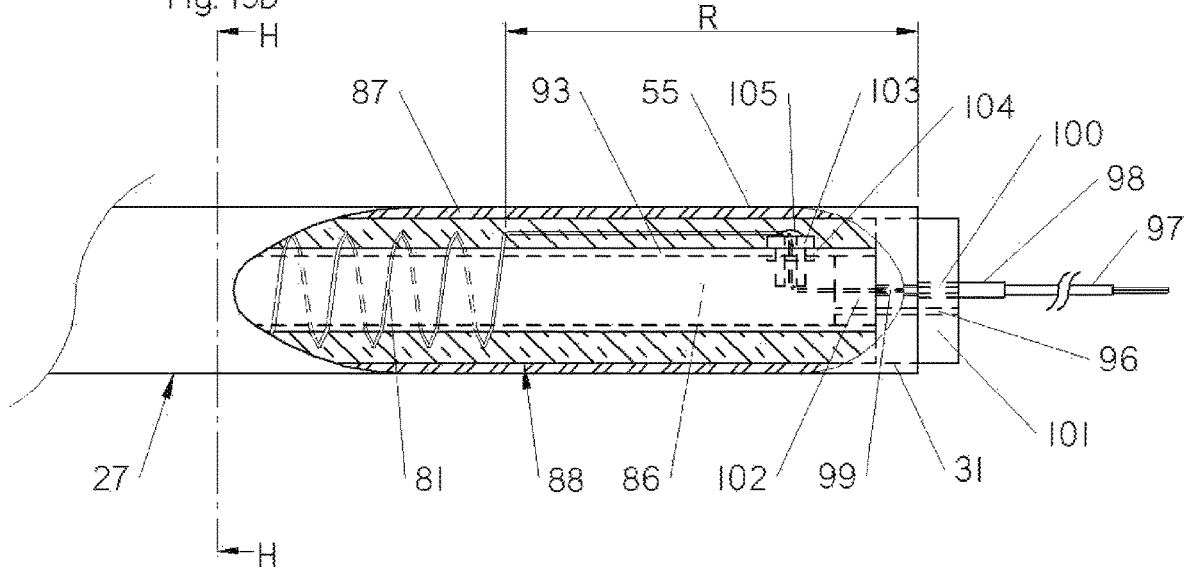
FIG. 19C (FIG. 19C) displays a front view of one end of a heating element, according to another alternative design of the third avenue of invention. It shows a partial view of the inside components within the elliptic cutaway in the center. It is similar to the one of FIG. 19B, except for how the coiled resistive conductor is connected to the outside lead wire.

FIG. 19C exposes a front perspective view of one end of another alternative design for the new innovative tubular and interstice heating element of FIG. 19A and FIG. 19B, with a partial view of the inside components within the elliptic cutaway in the center. The profile of the outer perimeter of its cross section can also be circular or triangular depending on the application. The basic types of profiles can be seen by the cross-sectional views of section H-H in FIG. 19D. This design is equivalent to the one defined in the description of FIG. 19B, except for the lead wires 97 located in the center of the electrically insulating grommets 101, rather than on the sides. In this case, a ceramic grooved eyelet 103, installed in a hole made through inner metallic tube 93, is used to pass the coiled resistive conductor 81 in the center of inner metallic tube 93. From there, the coiled resistive conductor 81 connects with lead wire 97 in the same manner as explained in the description of FIG. 19B. The ceramic grooved eyelet 103 is held in place by a retaining ring 104 inserted into a groove around the bottom portion of ceramic grooved eyelet 103, and located next to the inner wall of inner metallic tube 93. A high temperature resistant adhesive-sealant 105 is used to set the coiled resistive conductor 81, and to seal the hole of ceramic grooved eyelet 103 in order to prevent electrically insulating material 88 to escape into the inner metallic tube 93. In this design, air hole 96 is displaced from the center of electrically insulating grommet 101. Fitted section 102 of electrically insulating grommet 101 provide the support for inner metallic tube 93. Electrically insulating grommets 101 need to meet the same requirements, and made from the same choice of materials, as electrically insulating grommets 89 in the description of FIG. 19A above. High temperature resistant adhesive-sealant 105 needs to meet the same requirements, and made from the same choice of materials as high temperature resistant adhesive-sealant 31.

Figure 19D:
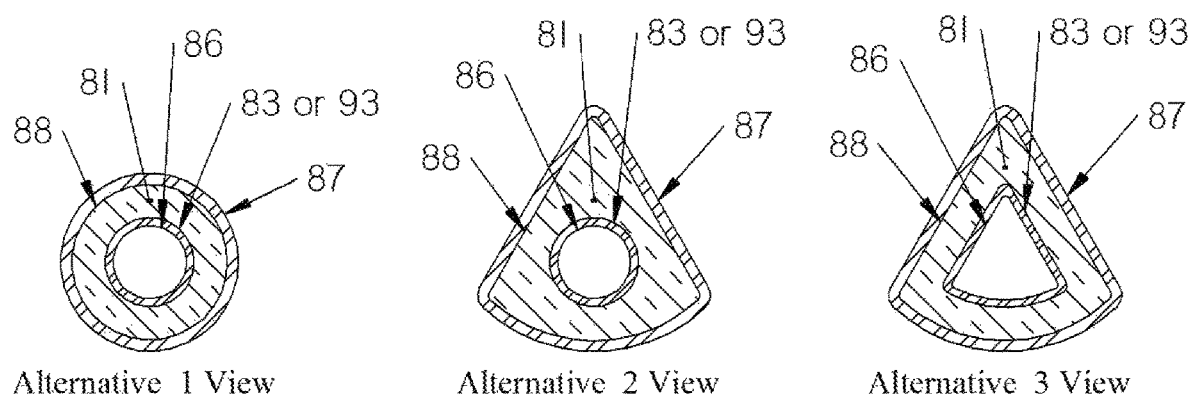
FIG. 19 D illustrates alternative cross-sectional views sectioned perpendicularly across their longitudinal main axis, near the middle, of each of the alternative profiles for each of the assembly designs of FIG. 19A, FIG. 19B, and FIG. 19C of the third avenue of invention having electrical terminals at each end.

FIG. 19D are cross-sectional views of section H-H from each of drawings of FIG. 19A, FIG. 19B, and FIG. 19C for this third avenue of invention. Each of the alternative cross-sectional views are alternative design profiles that each type of tubular and interstice heating element designs can have. Alternative 1, is where both inner metallic tube 83 or 93, and outer metallic tube 87 are circular. In Alternative 2, the inner metallic tube 83 or 93 is circular, and outer metallic tube 87 has a triangular profile, or a profile of a curvilinear triangle, or one of the profile or a mixture of the profiles of FIG. 10. Alternative 3 is equivalent to Alternative 2, except for inner metallic tube 83 or 93 having also a triangular profile, or a profile of a curvilinear triangle, or one of the profile or a mixture of the profiles of FIG. 10. In this case, the coiled resistive conductor 81 will need to be coiled with a profile equivalent to the inner metallic tube 83 or 93.

Figure 20A:
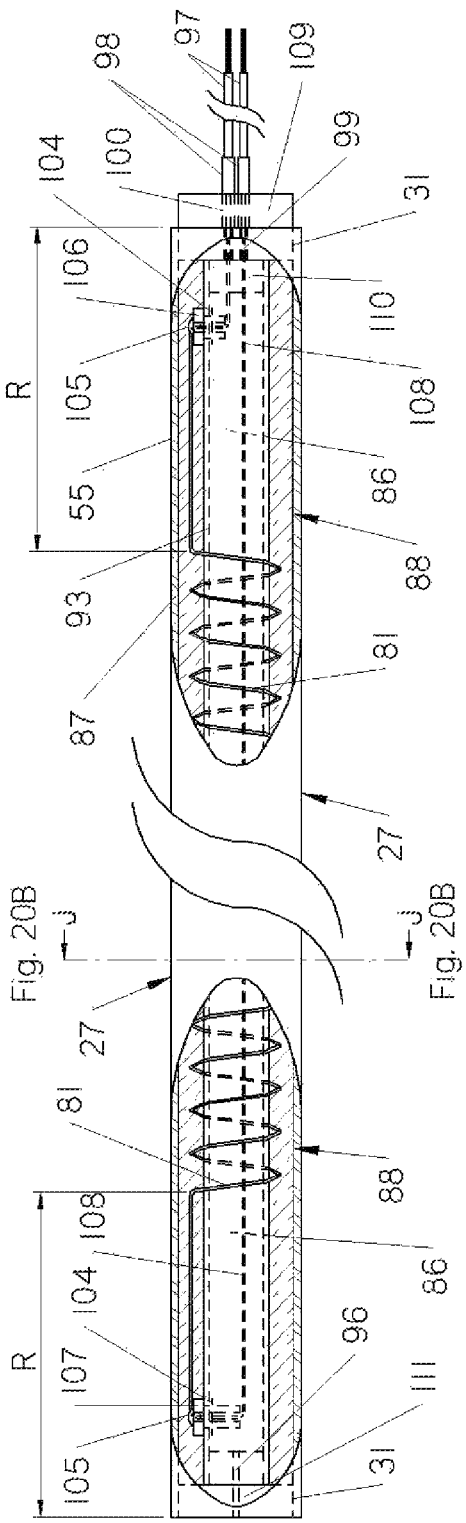
FIG. 20A (FIG. 20A) displays a front view of a heating element, according to another alternative design of the third avenue of invention, when radiant heating elements of large sizes or cross sections are required. It shows a partial view of the inside components within the elliptic cutaway in the center, for a new design of metallic tubular heating element with the electrical terminals positioned at the same end. The design is still based on the use of two metallic tubes to create an interstice, where the coiled resistance conductor and the electrically insulating material are located.

FIG. 20A illustrates a front perspective view of one end of an alternative series of the new innovative design for tubular and interstice heating elements, where the electrical terminals are on only one end. This perspective view also includes a partial view of the inside components within the elliptic cutaway in the center, and it is within the third avenue of invention. The profile of the outer perimeter of its cross section can also be circular or triangular depending on the application. The basic types of profiles can be seen by the cross-sectional views of section J-J in FIG. 20B. This design is equivalent to the one defined in the description of FIG. 19C, except for the modifications required to bring the two ends of coiled resistive conductor 81 on the same end of the tubular and interstice heating element. In a similar manner, ceramic grooved eyelets 106 and 107, of different lengths than ceramic grooved eyelet 103, provide the means, along with retaining rings 104, to have both ends of coiled resistive conductor 81 inside inner metallic tube 93. Inside inner metallic tube 93, the conductor straight section 108 of coiled resistive conductor 81 can touch the inner wall of inner metallic tube 93, as it insulated at each end with electrically insulating grommets 109 and 111. Both insulating grommets 109 and 111 need to meet the same requirements, and made from the same choice of materials, as electrically insulating grommets 89 in the description of FIG. 19A above. Fitted section 110 of electrically insulating grommet 109 and electrically insulating grommet 111 provide the support for inner metallic tube 93. Air hole 96 within electrically insulating grommet 111 permits air pressure regulation inside inner metallic tube 93 during the heating cycles. This new design can also be used to replace the ones described in the previous figures for radiant heating elements 14 and 44.

Figure 20B:
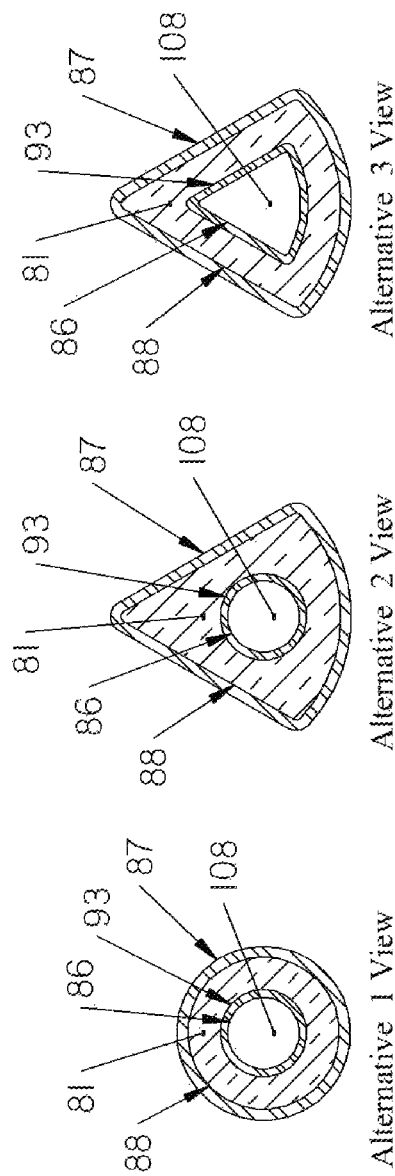
FIG. 20B illustrates alternative cross-sectional views sectioned perpendicularly across their longitudinal main axis, near the middle, of each of the alternative profiles for the alternative design of FIG. 20A, where the electrical terminals are only on one end.

FIG. 20B are cross-sectional views of section J-J from the drawing of FIG. 20A, which are part of this third avenue of invention. Each of the alternative cross-sectional views are alternative design profiles that each type of tubular and interstice heating element designs can have. Alternative 1, is where both inner metallic tube 93 and outer metallic tube 87 are circular. In Alternative 2, the inner metallic tube 93 is circular, and outer metallic tube 87 has a triangular profile, or a profile of a curvilinear triangle, or one of the profile or a mixture of the profiles of FIG. 10. Alternative 3 is equivalent to Alternative 2, except for inner metallic tube 93 having also a triangular profile, or a profile of a curvilinear triangle, or one of the profile or a mixture of the profiles of FIG. 10. In this case, the coiled resistive conductor 81 will need to be coiled with a profile equivalent to the inner metallic tube 93.

Figure 21:
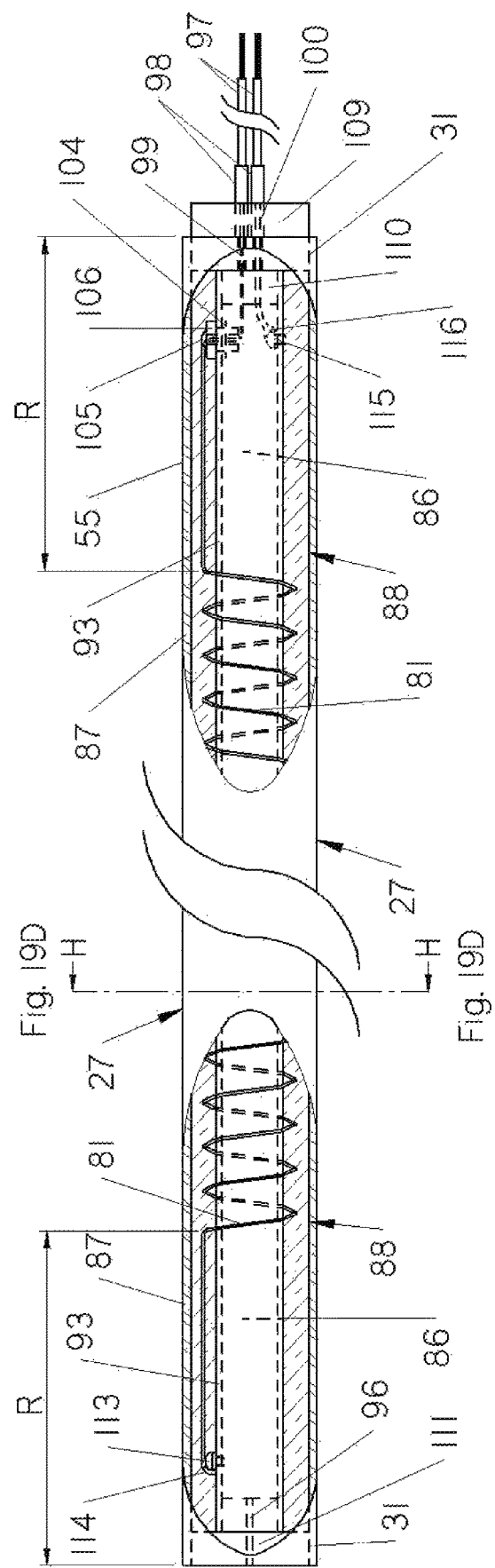
FIG. 21 (FIG. 21) shows a front view of a heating element, according to another alternative design of the third avenue of invention, when heating elements of large sizes or cross sections are required. It shows a partial view of the inside components within the elliptic cutaway in the center, of a similar design as for FIG. 20A, except it uses the inner metallic tube to carry the electrical current back to the termination end of the element. In this alternative design, the cross sections of the alternative profiles at section H-H are similar to those shown in FIG. 19D.

FIG. 21 displays a front perspective view of one end of an alternative design of the new innovative design for tubular and interstice heating elements, where the electrical terminals are on only one end. This perspective view also includes a partial view of the inside components within the elliptic cutaway in the center, and it is within the third avenue of invention. The profile of the outer perimeter of its cross section can also be circular or triangular depending on the application. The basic types of profiles can be seen by the cross-sectional views of section H-H in FIG. 19D. This design is equivalent to the one defined in the description of FIG. 20A, except the inner metallic tube 93 is used as the conductor for bringing the current back to the end of the tubular and interstice heating element where both lead wires 97 are located. To do this, the end of the coiled resistive conductor 81 that is opposite to the lead wires 97, is fastened to the inner metallic tube 93 under a screw 113 and a weld 114. By the same method, the conductor of the lead wire 97 that is not in contact with the coiled resistive conductor 81, is extended long enough to be fastened to the inner metallic tube 93 under a screw 115 and a weld 116. Hence, only ceramic grooved eyelet 106 and a retaining ring 104 are required.

The innovations and advantages provided by the various designs of the three avenues of invention described above, give the possibility of having heating elements that are larger in cross-sectional outer perimeter across their narrow outlines than in the prior art. The triangular outer perimeter profile brings the possibility for having radiant heater with much narrower width across the radiant heating element. Other advantages over the prior art for the three avenues of invention are:

a) Shorter lengths of radiant heaters for the same power input, and b) Obtaining lower power densities (power per surface area) for the radiant heating elements, to attain lower surface temperatures down to the levels where no light is emitted, or even lower, while keeping the length of radiant heaters at reasonable levels, and a) Having safe radiant heaters of reasonable size to fit in a home or office space, in close proximity with a wall and/or a ceiling, with radiant heat efficiencies ranging from 60% to 72% depending on heating element surface temperature, and on the effectiveness of the components, and where the heating element can also be colored to fit well with the room decor, and b) Having radiant heaters that will provide benefits from the best method to reduce energy consumption from indoor space heating, and from outdoor spot heating, and c) Having radiant heaters for high ceiling indoor spaces and outdoor spot heating with robust radiant heating elements that have much longer life expectancies, and d) Having radiant heaters for high ceiling indoor spaces and outdoor spot heating with radiant heat efficiencies ranging from 74% to 85% depending on heating element surface temperature, and on the effectiveness of the components, and benefiting from the best method to reduce energy consumption.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

I claim the following:

1. A radiant heating element comprising:
a hollow metallic profile;
a metallic tubular heating element;
an interstice between the metallic tubular heating element and the cross-sectional inner perimeter of the hollow metallic profile across its narrow outline; and
a high temperature resistant adhesive-sealant in the interstice to adhere to metallic surfaces on each side of the interstice and to prevent the movement of the metallic tubular heating element within the hollow metallic profile, wherein the high temperature resistant adhesive-sealant has a resistance to operating temperatures at corresponding positions;
wherein the outer surface of the hollow metallic profile is oxidized, or treated with a coating;
wherein the coefficient of emissivity of the hollow metallic profile is improved;
wherein the metallic tubular heating element is positioned at the longitudinal center of the hollow metallic profile, whereby the electrical terminations of the metallic tubular heating element are accessible and outside of the hollow metallic profile;
wherein the metallic tubular heating element includes the types where the electrical terminations are located at each of its ends, or at only one of its ends; and
wherein the hollow metallic profile has a cross-sectional outer surface perimeter across its narrow outline of at least 60 millimeters, and said radiant heating element is used for electric radiant heaters.

2. The radiant heating element of claim 1, wherein the hollow metallic profile has a cross-sectional outer contour of its narrow outline shaped in the form of any type of triangle, including those where at least one of the sides has a curvilinear shape.

3. A radiant heating element comprising:
a hollow metallic profile having an outer surface being oxidized, or treated with a coating, to improve the coefficient of emissivity of the outer hollow metallic profile;
a metallic tubular heating element;
an interstice between the metallic tubular heating element and the cross-sectional inner perimeter of the hollow metallic profile across its narrow outline; and
a powder or grit of thermally conductive material in the interstice;
wherein the hollow metallic profile and the powder or grit of thermally conductive material are held in place along the metallic tubular heating element with the use of either an insulating grommet with a large diameter flange at each end of the metallic tubular heating element or by the use of an end plug fitted into the hollow metallic profile at each of its ends, and over the metallic tubular heating element where there is an electrical termination;
wherein the end plugs are press-fitted and/or glued with an adhesive-sealant to the ends of the hollow metallic profile, and to the tubular metallic heating element at each end where it exists the hollow metallic profile, and wherein the powder or grit of thermally conductive material has a resistance to operating temperatures within the interstice, is free-flowing and is dry prior to assembly.

4. The radiant heating element of claim 1, further comprising a plurality of hollow metallic profiles selected to fit into each other.

5. A heating element comprising: an inner metallic tube, an outer metallic tube, a coiled resistance conductor, an electrically insulating material, electrically insulating grommets, and electrical terminals; wherein the inner metallic tube is inside the outer metallic tube and sizes of the inner and outer metallic tubes chosen to create an interstice between them; wherein the coiled resistance conductor fits over the inner metallic tube and extends longitudinally from one end to the other end of both metallic tubes without touching them; wherein the electrically insulating material is in the form of a powder or grit and located within the interstice and embeds the coiled resistance conductor; wherein the overall electrical resistance and length of the coiled resistive conductor are set according to the input voltage and input power desired; wherein the electrically insulating grommets are fitted at each end of both the inner metallic tube and outer metallic tube to retain the electrically insulating material within the interstice; and wherein a hole is made throughout the electrically insulating grommet where each end of the coil resistance conductor is located to reach and be fixed to one of the electrical terminals, whereby each electrical terminal extends outside of the corresponding electrically insulating grommet and outside of the heating element.

6. The heating element of claim 5, wherein the inner metallic tube is shorter than the outer metallic tube; wherein the heating element further comprises at each end of the heating element a hollow metallic cold stem at the end of the inner metallic tube, wherein the hollow metallic cold stem begins from a center hole in the first electrical insulating grommet fixed at the end of the inner metallic tube and extends to the outside of the outer metallic tube through a center hole in the second electrically insulating grommet inserted at the end of the outer metallic tube, whereby the first electrically insulating grommet is smaller than the second electrically insulating grommet and the center hole in each of them is tight fitted around the hollow metallic cold stem to prevent any leakage of the electrically insulating material; wherein the first insulating grommet is either press-fitted or glued with a high temperature resistant adhesive-sealant to the inner wall of the inner metallic tube, wherein the second electrically insulating grommet is either press-fitted or glued with an adhesive-sealant to the inner wall of the outer metallic tube; wherein the coiled resistance conductor is welded, or fastened, or fixed to the hollow metallic cold stem between the first and second electrically insulating grommets, and the end of the hollow metallic cold stem which is outside of the outer metallic tube serves as one of the electrical terminations; wherein the first electrically insulating grommet, the second electrically insulating grommet, the high temperature resistant adhesive-sealant and the adhesive-sealant have a resistance to the operating temperatures at their respective locations.

7. The heating element of claim 6, further comprising at each end a shoulder and a coil junction, whereby both the shoulder and the coil junction are located on the outer surface of the hollow metallic cold stem, and are integral parts of the hollow metallic cold stem, and are positioned between the first electrically insulating grommet and the second electrically insulating grommet, wherein the shoulder is inline with the end of the inner metallic tube and touching the first electrically insulating grommet to hold it in place at that position; wherein an uncoiled section of one end of the coiled resistive conductor is wound and welded, or fastened, or fixed to the coil junction, and the balance of the coiled resistive conductor progresses within the interstice until it reaches the other cold junction at the other end of the heating element.

8. The heating element of claim 7, each end of the heating element further comprising a threaded end on the hollow metallic cold stem and two sets of nuts and washers, whereby the threaded end is located at the tip of the hollow metallic cold stem, and outside of the end of the outer metallic tube and the second electrically insulating grommet, and the threaded end progresses partly inside the second electrically insulating grommet; wherein one set of metallic nut and washer is inserted along the threaded end to secure in place the second electrically insulating grommet at the end of the outer metallic tube, wherein the threaded end and the other set of metallic nuts and washers at each end of the heating element act as the electrical terminals to make the connections to the electrical power supply; and wherein the hole throughout the hollow metallic cold stem prevents an increase in air pressure inside the inner metallic tube during the heating cycles of the heating element.

9. The heating element of claim 5, each end of the heating element further comprising a lead wire, a shrinkable tubing, an adhesive-sealant, and a air hole; wherein the end of the inner metallic tube is close to the end of the outer metallic tube, whereby a single electrically insulating grommet is used at each end of the heating element, wherein the electrically insulating grommet has two stages where the inner stage has dimensions to fit and seal at the end of the inner metallic tube, and the outer stage has dimensions to fit and seal at the end of the outer metallic tube; wherein the end of the coiled resistance conductor has an uncoiled section which passes through the electrically insulating grommet in a hole, which is parallel to the mid-way location between the inner metallic tube and the outer metallic tube, and the end of the uncoiled section the coiled resistance conductor is crimped, or welded, or fixed to one end of the conductor of the lead wire through the opposite end of the same hole within the electrically insulating grommet; wherein the shrinkable tubing is inserted over the lead wire and into the hole of the electrically insulating grommet to provide strain relief to the lead wire at that position, wherein the lead wire acts as one of the electrical terminals; wherein the adhesive-sealant is applied into the hole of the electrically insulating grommet and around the shrinkable tubing to fix into place the lead wire, and to prevent leakage of the electrically insulating material from the interstice to the outside; wherein the air hole is located in the center and throughout the electrically insulating grommet to prevent air pressure increase inside the inner metallic tube during the heating cycles of the heating element; and wherein the lead wire and the shrinkable tubing are made from materials resisting the operating temperatures at their corresponding positions, wherein the lead wire gauge size is set according to the electrical current, wherein the adhesive-sealant is chosen to withstand the operating temperatures at its position, and to provide adhesion to both the shrinkable tubing and the electrically insulating grommet.

10. The heating element of claim 5, further comprises at each end, a grooved ceramic eyelet, a retaining ring, a lead wire, a shrinkable tubing, and adhesive-sealant, a high temperature resistant adhesive-sealant, and an air hole, wherein the end of the inner metallic tube is close to the end of the outer metallic tube, whereby a single electrically insulating grommet is used at each end of the heating element, wherein the electrically insulating grommet has two stages where the inner stage has dimensions to fit and seal at the end of the inner metallic tube, and the outer stage has dimensions to fit and seal at the end of the outer metallic tube; wherein the grooved ceramic eyelet is positioned in a hole through the wall of the inner metallic tube near its end and behind the position of the electrically insulating grommet, whereby the grooved ceramic eyelet has a flange on one side positioned on the outer wall of the inner metallic tube, and the grooved ceramic eyelet is equipped with a snap-in retaining ring on the other side to fix it in position; wherein the end of the coiled resistance conductor has an uncoiled section which passes through the center hole of the grooved ceramic eyelet and into the inner metallic tube, and is crimped, or welded, or fixed to one end of the conductor of the lead wire, wherein the grooved ceramic eyelet has a length to prevent electrical short circuit between the uncoiled end section of the coiled resistance conductor and the inner metallic tube; wherein the lead wire passes through a hole in the electrically insulating grommet without touching the inner walls of the inner metallic tube, whereby the shrinkable tubing is inserted over the lead wire and into the hole of the electrically insulating grommet to provide strain relief to the lead wire at that position; wherein the adhesive-sealant is applied into the hole of the electrically insulating grommet and around the shrinkable tubing to fix the lead wire into place, and the high temperature resistance adhesive-sealant is applied in the hole of the grooved ceramic eyelet to seal the space within the hole, to prevent leakage of the electrically insulating material from the interstice and into the inner metallic tube; wherein the lead wire acts as one of the electrical terminals; wherein the air hole is located along side the hole for the lead wire and is throughout the electrically insulating grommet to prevent air pressure increase inside the inner metallic tube during heating cycles of the heating element; and wherein the lead wire and the shrinkable tubing are made from materials resisting the operating temperatures at their corresponding positions, wherein the lead wire gauge size is set according to the electrical current, wherein the adhesive-sealant and the high temperature resistant adhesive-sealant are chosen to withstand the operating temperatures at their respective positions.

11. The heating element of claim 5, further comprises at one end, a grooved ceramic eyelet, a retaining ring, two lead wires, two shrinkable tubing, an adhesive-sealant and a high temperature resistant adhesive-sealant, and further comprising at the other end of the heating element, a grooved ceramic eyelet, a retaining ring, a high temperature resistant adhesive-sealant, and an air hole; wherein the ends of the inner metallic tube are close to the ends of the outer metallic tube, whereby a single electrically insulating grommet is used at each end of the heating element, wherein the electrically insulating grommet has two stages where the inner stage has dimensions to fit and seal at the end of the inner metallic tube, and the outer stage has dimensions to fit and seal at the end of the outer metallic tube; wherein the grooved ceramic eyelets are each positioned in a hole through the wall of the inner metallic tube near each of its ends and behind the position of the electrically insulating grommets, whereby the grooved ceramic eyelets have each a flange on one side positioned on the outer wall of the inner metallic tube, and the grooved ceramic eyelets are equipped with a snap-in retaining ring on the other side to fix them in their respective positions, wherein the ends of the coiled resistance conductor have uncoiled sections which pass through the center hole of the grooved ceramic eyelets and into the inner metallic tube, and whereby at one end of the heating element, the uncoiled end section of the coiled resistance conductor is longer than at the other end and directed in the opposite direction, and passes through the whole length of the inner metallic tube without touching its inner side walls to reach the opposite electrically insulating grommet, and passes through a hole into it; wherein the other end of the coiled resistance conductor also passes through the same electrically insulating grommet using another hole; wherein each end of the coiled resistance conductor is crimped, or welded, or fixed to one end of the conductor of one of the lead wire, whereby each lead wire also passes through one of the corresponding holes in the electrically insulating grommet, from the opposite end, whereby the holes are positioned near the center of the electrically insulating grommet to prevent any of the conductors from touching the inner walls of the inner metallic tube; wherein each shrinkable tubing is inserted over one of the lead wires and into the corresponding hole of the electrically insulating grommet to provide strain relief to the lead wires at their positions, wherein the lead wires act as the electrical terminals; wherein the grooved ceramic eyelets have a length to prevent electrical short circuit between the uncoiled end sections of the coiled resistance conductor and the inner metallic tube; wherein the adhesive-sealant is applied into the holes of the electrically insulating grommet and around each shrinkable tubing to fix into place the lead wires, and the high temperature resistant adhesive-sealant is applied in the hole of each grooved ceramic eyelet to seal the space within the hole, to prevent leakage of the electrically insulating material from the interstice and into the inner metallic tube; and wherein the electrically insulating grommet, which is opposite the one with the two lead wires, has the air hole throughout to prevent air pressure increase inside the inner metallic tube during heating cycles of the heating element.

12. The heating element of claim 5, further comprises at one end, a grooved ceramic eyelet, a retaining ring, a metallic fastener, two lead wires, two shrinkable tubing, an adhesive-sealant and a high temperature resistant adhesive-sealant, and further comprises at the other end of the heating element, a metallic fastener, and an air hole; wherein the ends of the inner metallic tube are close to the ends of the outer metallic tube, whereby a single electrically insulating grommet is used at each end of the heating element, whereby the electrically insulating grommet has two stages where the inner stage has dimensions to fit and seal at the end of the inner metallic tube, and the outer stage has dimensions to fit and seal at the end of the outer metallic tube; wherein at one end of the heating element, the grooved ceramic eyelet is positioned in a hole through the wall of the inner metallic tube near its end and behind the position of the electrically insulating grommet, whereby the grooved ceramic eyelet has a flange on one side positioned on the outer wall of the inner metallic tube, and the grooved ceramic eyelet is equipped with a snap-in retaining ring on the other side to fix it at its position; wherein the end of the coiled resistance conductor has an uncoiled section which passes through the grooved ceramic eyelet and into the inner metallic tube; wherein at the other end of the heating element, the end of the coiled resistance conductor has also an uncoiled section whereby its tip is bent into a 90 degree angle towards the inner metallic tube, and is fixed by the metallic fastener to the outer surface of the inner metallic tube near the electrically insulating grommet at that end; wherein back at the other end of the heating element, the end of the coiled resistance conductor, which is inside the inner metallic tube, passes through a hole into the electrically insulating grommet, and is crimped, or welded, or fixed to one end of the conductor of one of the lead wire, whereby the lead wire also passes through the corresponding hole in the electrically insulating grommet; wherein the other lead wire corresponding to the other end of the coiled resistance conductor passes throughout the electrically insulating grommet through another hole, where its stripped conductor extends into the inner metallic tube and is fixed by the metallic fastener to the inner wall of the inner metallic tube and near the inner end of the electrically insulating grommet; whereby the inner metallic tube acts as the return conductor for the electrical current; wherein the other hole in the electrically insulating grommet for the lead wire, which is directly connected to the coiled resistance conductor, is positioned near the center of the electrically insulating grommet to prevent the uncoiled end portion of the coiled resistance conductor from touching the inner walls of the inner metallic tube; wherein each shrinkable tubing is inserted over one of the lead wires and into the corresponding hole of the electrically insulating grommet to provide strain relief to the lead wires at their positions, wherein the lead wires act as the electrical terminals; wherein the grooved ceramic eyelet has a length to prevent electrical short circuit between the uncoiled end section of the coiled resistance conductor and the inner metallic tube; wherein at the other end of the heating element, the electrically insulating grommet has the air hole throughout to prevent air pressure increase inside the inner metallic tube during heating cycles; and wherein for the whole heating element, the adhesive-sealant is applied into the holes of the electrically insulating grommet for the lead wires and around each shrinkable tubing to fix the lead wires into place, and the high temperature resistant adhesive-sealant is applied in the hole of the grooved ceramic eyelet to seal the space within the hole, to prevent leakage of the electrically insulating material from the interstice and into the inner metallic tube.

13. The heating element of claim 5, wherein the heating element is vibrated by a device prior to the insertion of the last electrically insulating grommet, to compact the powder or grit of the electrically insulating material inside the interstice.

14. The heating element of claim 5, wherein from the outer metallic tube and the inner metallic tube, at least the outer metallic tube has a cross-sectional outer contour of its narrow outline in one of the following forms: a circular profile, a polygon, a polygon where at least one side with a different length than the other sides, a polygon where at least one side with a curvilinear shape, a polygon where at least one side with a different length than the other sides and with a curvilinear shape.

15. The radiant heating element of claim 1, wherein the hollow metallic profile has a cross-sectional outer contour across its narrow outline in the form of a circle, whereby the diameter of the circle is 19 millimeters or larger.

16. The radiant heating element of claim 1, wherein the high temperature resistant adhesive-sealant is made from ceramic, and/or metallic, and/or metal oxide, and/or carbon, and/or silicon dioxide powders or fibers mixed with an inorganic binder system which includes water-dispersed aluminum phosphate binders, or water-dispersed potassium silicate binders.

17. The radiant heating element of claim 3, wherein the heating element is vibrated by a vibrating device prior to the insertion of the last electrically insulating grommet or the last end plug to compact the powder or grit of thermally conductive material inside the hollow metallic profile.

18. The heating element of claim 5, wherein the electrically insulating material is selected from the group of ceramics, wherein the ceramic material comprises aluminum oxide and magnesium oxide; wherein the electrically insulating grommets are made from either mica, silicone rubber, or ceramic materials; and wherein the coiled resistance conductor is made from alloys of nickel, or from nickel-chrome alloys.

19. The heating element of claim 6, wherein the high temperature resistant adhesive-sealant is made from ceramic, and/or metallic, and/or metal oxide, and/or carbon, and/or silicon dioxide powders or fibers mixed with an inorganic binder system which includes water-dispersed aluminum phosphate binders, or water-dispersed potassium silicate binders; and wherein the adhesive-sealant is made from the group of silicones, or epoxies, or from the group mentioned for the high temperature resistant adhesive-sealant.

20. The heating element of claim 5, wherein the outer surface of the outer metallic tube is oxidized, or treated with a coating, to improve its coefficient of emissivity.

21. The heating element of claim 5, wherein from the outer metallic tube and the inner metallic tube, at least the outer metallic tube has a cross-sectional outer contour of its narrow outline shaped in the form of any type of triangle, including those where at least one of the sides has a curvilinear shape.

22. The heating element of claim 5, further comprises a plurality of inner metallic tubes and/or a plurality of outer metallic tubes selected to fit into each other.

23. The radiant heating element of claim 3, wherein the thermally conductive material is selected from the group of ceramics, the ceramic material comprising silicon carbide, aluminum oxide and magnesium oxide; wherein the insulating grommets with large diameter flange and end plugs are made from either mica, silicone rubber, or ceramic materials; and wherein the adhesive-sealant is made from the group of silicones, or epoxies, or made from high temperature resistant materials consisting of ceramic, and/or metallic, and/or metal oxide, and/or carbon, and/or silicon dioxide powders or fibers mixed with an inorganic binder system which includes water-dispersed aluminum phosphate binders, or water-dispersed potassium silicate binders.

24. The heating element of claim 9, wherein the lead wire is composed of a conductor made of tinned copper, or nickel coated copper, or silver coated copper, or nickel, and is either uncoated or coated with an insulation using cross-linked polyethylene, or cross-linked polyvinyl chloride, or a fluoropolymer, or a crosslinked fluoropolymer, or fiberglass, or mica, or both mica and fiberglass; wherein the shrinkable tubing is made from cross-linked polyethylene, or cross-linked polyvinyl chloride, or crosslinked fluoropolymer; and wherein the adhesive sealant is made from the group of silicones, or epoxies, or made from high temperature resistant materials consisting of ceramic, and/or metallic, and/or metal oxide, and/or carbon, and/or silicon dioxide powders or fibers mixed with an inorganic binder system which includes water-dispersed aluminum phosphate binders, or water-dispersed potassium silicate binders.

25. The heating element of claim 10, wherein the retaining ring holds the grooved ceramic eyelet in place when pushed into the groove within the grooved ceramic eyelet; wherein the lead wire is composed of a conductor made of tinned copper, or nickel coated copper, or silver coated copper, or nickel, and is either uncoated or coated with an insulation using cross-linked polyethylene, or cross-linked polyvinyl chloride, or a fluoropolymer, or a crosslinked fluoropolymer, or fiberglass, or mica, or both mica and fiberglass; wherein the shrinkable tubing is made from cross-linked polyethylene, or cross-linked polyvinyl chloride, or a crosslinked fluoropolymer; wherein the high temperature resistant adhesive-sealant is made from ceramic, and/or metallic, and/or metal oxide, and/or carbon, and/or silicon dioxide powders or fibers mixed with an inorganic binder system which includes water-dispersed aluminum phosphate binders, or water-dispersed potassium silicate binders; and wherein the adhesive sealant is made from the group of silicones, or epoxies, or from the group mentioned for the high temperature resistant adhesive-sealant.

26. The heating element of claim 11, wherein the retaining ring holds the grooved ceramic eyelet in place when pushed into the groove within the grooved ceramic eyelet; wherein the lead wire is composed of a conductor made of tinned copper, or nickel coated copper, or silver coated copper, or nickel, and is either uncoated or coated with an insulation using a fluoropolymer, or a crosslinked fluoropolymer, or fiberglass, or mica, or both mica and fiberglass; wherein the shrinkable tubing is made from a fluoropolymer or a cross-linked fluoropolymer; wherein the high temperature resistant adhesive-sealant is made from ceramic, and/or metallic, and/or metal oxide, and/or carbon, and/or silicon dioxide powders or fibers mixed with an inorganic binder system which includes water-dispersed aluminum phosphate binders, or water-dispersed potassium silicate binders; and wherein the adhesive sealant is made from the group of silicones, or epoxies, or from the group mentioned for the high temperature resistant adhesive-sealant.

27. The heating element of claim 12, wherein the retaining ring holds the grooved ceramic eyelet in place when pushed into the groove within the grooved ceramic eyelet; wherein the lead wire is composed of a conductor made of tinned copper, or nickel coated copper, or silver coated copper, or nickel, and is either uncoated or coated with an insulation using a fluoropolymer, or a crosslinked fluoropolymer, or fiberglass, or mica, or both mica and fiberglass; wherein the shrinkable tubing is made from a fluoropolymer or a cross-linked fluoropolymer; wherein the high temperature resistant adhesive-sealant is made from ceramic, and/or metallic, and/or metal oxide, and/or carbon, and/or silicon dioxide powders or fibers mixed with an inorganic binder system which includes water-dispersed aluminum phosphate binders, or water-dispersed potassium silicate binders; and wherein the adhesive sealant is made from the group of silicones, or epoxies, or from the group mentioned for the high temperature resistant adhesive-sealant.

28. A radiant heating element comprising:
   a hollow metallic profile having an outer surface being oxidized, or treated with a coating, to improve the coefficient of emissivity of the outer hollow metallic profile, the hollow metallic profile having:
      a cross-sectional outer surface perimeter across its narrow outline of at least 60 millimeters; and
      a cross-sectional outer contour of its narrow outline being shaped in the form of any type of triangle, including those where at least one of the sides has a curvilinear shape;
   a metallic tubular heating element;
   wherein the metallic tubular heating element is positioned at the longitudinal center of the hollow metallic profile, whereby the electrical terminations of the metallic tubular heating element are accessible and outside of the hollow metallic profile;
   wherein the metallic tubular heating element includes the types where the electrical terminations are located at each of its ends, or at only one of its ends; and
   wherein the radiant heating element is used for electric radiant heaters.

29. The radiant heating element of claim 28, further comprising one or more hollow metallic profiles of any cross-sectional shape selected to fit into each other and into an outer of the hollow metallic profiles.

30. The radiant heating element of claim 3, wherein the hollow metallic profile has a cross-sectional outer contour across its narrow outline in the form of a circle, whereby the diameter of the circle is 19 millimeters or larger.

31. A radiant heating element comprising:
   an outer hollow metallic profile having an outer surface being oxidized, or treated with a coating, to improve the coefficient of emissivity of the outer hollow metallic profile, the outer hollow metallic profile having a cross-sectional outer surface perimeter across its narrow outline of at least 60 millimeters;
   one or more inner hollow metallic profile selected to fit into the outer hollow metallic profile or into another inner hollow metallic profile; and
   a metallic tubular heating element;
   wherein the metallic tubular heating element is positioned at the longitudinal center of the plurality of hollow metallic profiles, whereby the electrical terminations of the metallic tubular heating element are accessible and outside of the plurality of hollow metallic profiles;
   wherein the metallic tubular heating element includes the types where the electrical terminations are located at each of its ends, or at only one of its ends; and
   wherein the radiant heating element is used for electric radiant heaters.

32. The radiant heating element of claim 31, wherein the outer hollow metallic profile has a cross-sectional outer contour of its narrow outline shaped in the form of any type of triangle, including those where at least one of the sides has a curvilinear shape.

33. The radiant heating element of claim 31, wherein the outer hollow metallic profile has a cross-sectional outer contour of its narrow outline shaped in the form of a circle, whereby the diameter of the circle is 19 millimeters or larger.

34. The radiant heating element of claim 3, wherein the hollow metallic profile has a cross-sectional outer contour of its narrow outline shaped in the form of any type of triangle, including those where at least one of the sides has a curvilinear shape.

35. The radiant heating element of claim 3, further comprising one or more hollow metallic profiles of any cross-sectional shape selected to fit into each other and into an outer of the hollow metallic profiles.

* * * * *